US009299118B1

(12) United States Patent
McGraw

(10) Patent No.: US 9,299,118 B1
(45) Date of Patent: Mar. 29, 2016

(54) METHOD AND APPARATUS FOR INSPECTING COUNTERSINKS USING COMPOSITE IMAGES FROM DIFFERENT LIGHT SOURCES

(75) Inventor: Michael D. McGraw, Bonney Lake, WA (US)

(73) Assignee: The Boeing Company, Chicago, IL (US)

( * ) Notice: Subject to any disclaimer, the term of this patent is extended or adjusted under 35 U.S.C. 154(b) by 704 days.

(21) Appl. No.: 13/449,590

(22) Filed: Apr. 18, 2012

(51) Int. Cl.
  H04N 7/26 (2006.01)
  G06T 1/00 (2006.01)
  B07C 5/10 (2006.01)

(52) U.S. Cl.
  CPC .............. G06T 1/0014 (2013.01); B07C 5/10 (2013.01)

(58) Field of Classification Search
  CPC .......... B07C 5/10; G06T 1/0014; G07D 7/12; G07D 7/20; G08B 13/19602
  USPC .......................................................... 348/94
  See application file for complete search history.

(56) References Cited

U.S. PATENT DOCUMENTS

| 4,873,651 | A  | * | 10/1989 | Raviv ............................ 700/259 |
| 4,924,304 | A  | * | 5/1990  | Freeman ......................... 348/87 |
| 5,369,491 | A  | * | 11/1994 | Schneider ...................... 356/626 |
| 5,543,910 | A  | * | 8/1996  | Wallin ........................... 356/3.14 |
| 5,825,017 | A  | * | 10/1998 | Pryor ............................ 250/208.1 |
| 6,114,683 | A  |   | 9/2000  | Spiering et al. |
| 6,503,195 | B1 |   | 1/2003  | Keller et al. |
| 6,751,344 | B1 | * | 6/2004  | Grumbine ...................... 382/154 |
| 6,912,047 | B2 |   | 6/2005  | Furiya et al. |
| 7,171,033 | B2 |   | 1/2007  | Engelbart et al. |
| 7,495,758 | B2 | * | 2/2009  | Walton ......................... 356/237.1 |
| 7,626,569 | B2 | * | 12/2009 | Lanier ........................... 345/156 |
| 2001/0021804 | A1 | * | 9/2001 | Nadeau .......................... 600/407 |
| 2001/0048763 | A1 | * | 12/2001 | Takatsuka et al. ............. 382/154 |
| 2002/0001036 | A1 | * | 1/2002 | Kinjo ............................ 348/231 |
| 2002/0039183 | A1 | * | 4/2002 | Yagita ......................... 356/240.1 |
| 2002/0044682 | A1 | * | 4/2002 | Weil et al. ..................... 382/154 |
| 2002/0048027 | A1 | * | 4/2002 | Pettersen et al. .............. 356/614 |
| 2002/0167809 | A1 | * | 11/2002 | Glass ............................ 362/290 |
| 2003/0069795 | A1 | * | 4/2003 | Boyd et al. ..................... 705/22 |
| 2003/0151664 | A1 | * | 8/2003 | Wakimoto et al. ............ 348/148 |
| 2003/0156751 | A1 | * | 8/2003 | Lee et al. ...................... 382/154 |
| 2003/0160193 | A1 | * | 8/2003 | Sanchez Revuelta et al. ........................ 250/559.19 |
| 2003/0164952 | A1 | * | 9/2003 | Deichmann et al. .......... 356/603 |
| 2003/0175024 | A1 | * | 9/2003 | Miyoshi et al. ............... 396/154 |

(Continued)

OTHER PUBLICATIONS

EESR for EP13164261 dated Jul. 1, 2013.

Primary Examiner — Jay Patel
Assistant Examiner — Joseph Suh
(74) Attorney, Agent, or Firm — Kunzler Law Group, PC

(57) ABSTRACT

Method and apparatus for measuring dimensionality of a component are disclosed herein. At least a first image may be collected from a first camera of an aperture or a first precision countersink of the component. The first camera may be in a first position and may operate in one or more luminance environments. At least a second image may be collected from a second camera of the aperture or a second precision countersink of the component. The second camera may be in a second position and may operate in an alternative lighting environment to differentiate characteristic features including hole and countersink against their intersection with the component. Positional and process refinement parameters may be calculated for, and provided to, one or more numerically controlled mechanisms, based on the collected first and second images.

26 Claims, 19 Drawing Sheets

(56) References Cited

U.S. PATENT DOCUMENTS

| | | | |
|---|---|---|---|
| 2003/0223083 A1* | 12/2003 | Geng | 356/603 |
| 2004/0070825 A1* | 4/2004 | Charlesworth | 359/462 |
| 2004/0155956 A1* | 8/2004 | Libbey | 348/14.16 |
| 2004/0156016 A1* | 8/2004 | Kerr et al. | 351/206 |
| 2004/0184031 A1* | 9/2004 | Vook et al. | 356/237.1 |
| 2004/0205483 A1* | 10/2004 | Massarsky | 715/500.1 |
| 2004/0238732 A1* | 12/2004 | State et al. | 250/250 |
| 2004/0240754 A1* | 12/2004 | Smith et al. | 382/286 |
| 2005/0024199 A1* | 2/2005 | Huey et al. | 340/521 |
| 2005/0117045 A1* | 6/2005 | Abdellatif et al. | 348/335 |
| 2005/0117118 A1* | 6/2005 | Miller et al. | 351/246 |
| 2005/0132306 A1* | 6/2005 | Smith et al. | 716/1 |
| 2005/0141088 A1* | 6/2005 | Christian | 359/462 |
| 2006/0227210 A1* | 10/2006 | Raab et al. | 348/139 |
| 2007/0085905 A1* | 4/2007 | Batson et al. | 348/92 |
| 2007/0091177 A1* | 4/2007 | West et al. | 348/152 |
| 2008/0044063 A1* | 2/2008 | Friedman et al. | 382/117 |
| 2008/0098834 A1* | 5/2008 | Sergoyan et al. | 73/866.5 |
| 2009/0051938 A1* | 2/2009 | Miousset et al. | 356/625 |
| 2009/0076476 A1* | 3/2009 | Barbagli et al. | 604/500 |
| 2009/0323192 A1* | 12/2009 | Towndrow et al. | 359/634 |
| 2010/0165134 A1* | 7/2010 | Dowski et al. | 348/218.1 |
| 2011/0115882 A1* | 5/2011 | Shahinian et al. | 348/45 |
| 2011/0251488 A1* | 10/2011 | Gritzky | 600/443 |
| 2011/0257801 A1* | 10/2011 | Kumula et al. | 700/287 |
| 2013/0287293 A1* | 10/2013 | Genc et al. | 382/154 |
| 2013/0330154 A1* | 12/2013 | Sowden et al. | 414/222.02 |
| 2014/0005486 A1* | 1/2014 | Charles | 600/202 |

* cited by examiner

METHOD AND APPARATUS FOR INSPECTING COUNTERSINKS USING COMPOSITE IMAGES FROM DIFFERENT LIGHT SOURCES

CROSS-REFERENCE TO RELATED APPLICATIONS/INCORPORATION BY REFERENCE

[Not Applicable]

FEDERALLY SPONSORED RESEARCH OR DEVELOPMENT

[Not Applicable]

MICROFICHE/COPYRIGHT REFERENCE

[Not Applicable]

FIELD

Certain embodiments of the invention relate generally to inspection of machined holes and countersinks in aircraft structures. More specifically, certain embodiments relate to an apparatus and method for inspection of precision countersinks in aircraft structures by machine vision.

BACKGROUND

Many industrial manufacturing processes depend on metal or composite structures, which utilize precision bored holes used for mounting and assembly. Often, the machined holes have precision countersinks on one or both ends of the machined hole. Such precision countersinks ensure proper fit of the receiving fastener, while preserving the structural integrity and aerodynamics of both the fastener and the underlying structure.

However, dimensional drift, such as cutter wear, surface abnormalities and minor part distortions, may cause deviations from the designed engineering tolerance of the countersinks, which necessitates frequent inspection of the countersunk surfaces by qualified technicians. The conventional methods of inspection in limited access regions include a visual inspection of the countersinks using a mirror, as well as a manual inspection using, for example, small caliper-type tools, mirrors, molding clay (e.g., by inspecting the countersink imprint on the clay), countersink depth gauges, or other means. The conventional methods of inspection, however, are time consuming and difficult to implement in confined spaces. Additionally, the countersinks generated on aircraft production parts, such as the titanium double-plus wing chord, have less than desirable accessibility since they are generated in areas of the structure that are recessed and/or located in confined space volumes. Conventional measuring devices and methods described above may not yield desirable results.

Accordingly, there is a need for systems and methods for inspecting precision countersinks in aircraft structures, where a quantifiable assessment of the precision countersinks can be performed, regardless of the location and accessibility of the machined hole surfaces.

BRIEF SUMMARY

A method and apparatus for inspection of precision countersinks in aircraft metal or composite structures by machine vision, substantially as shown in and/or described in connection with at least one of the figures, are therefore provided with embodiments that address at least some of the deficiencies identified above.

According to one aspect, a method for measuring dimensionality of a component may include collecting at least a first image from a first camera of an aperture or a first precision countersink of the component or other precision feature. The first camera may be in a first position and may operate in one or more luminance environments. At least a second image may be collected from a second camera of the aperture or a second precision countersink of the component. The second camera may be in a second position and may operate in an alternative lighting environment to differentiate characteristic features of the component, such as hole and countersink against their intersection with the surface of the component. Positional and process refinement parameters may be calculated for one or more numerically controlled mechanisms, based on the collected first and second images. The calculated positional and process refinement parameters may be fed back to one or more image processors to provide adaptive control of the one or more numerically controlled mechanisms.

According to another aspect, a method for inspecting a component may include deploying a first camera in a first position relative to an aperture within the component. A second camera may be deployed in a second position relative to the aperture. At least a first image may be collected from the first camera of the aperture or a first precision countersink of the component, where the first camera may operate in one or more luminance environments. At least a second image may be collected from the second camera of the aperture or a second precision countersink of the component, where the second camera may operate in an alternative lighting environment. At least one combined image of the first precision countersink and the second precision countersink may be generated based on the collected at least a first image and at least a second image. The at least one combined image may be superimposed with at least one indicator quantifying compliance of the component to one or more technical specifications.

According to still another aspect, an apparatus for inspecting a component may include a housing, first and second cameras attached to the housing, and a first and second periscopes attached to the housing. The first periscope may be disposed within the field of view of the first camera, and the second periscope may be disposed within the field of view of the second camera. The apparatus may further include at least one image processor, which may be configured to collect at least a first image from the first camera of an aperture or a first precision countersink of the component. The first camera may operate in at least one lighting environment. The at least one image processor may also be configured to collect at least a second image from the second camera of the aperture or a second precision countersink of the component. The second camera may operate in an alternative lighting environment. The at least one image processor may be further configured to generate at least one combined image of the first precision countersink and the second precision countersink based on the collected at least a first image and at least a second image. The at least one combined image may be superimposed with at least one indicator quantifying compliance of the component to one or more technical specifications.

According to yet another aspect, a method for measuring dimensionality of a component may include collecting at least a first image from a camera of an aperture or a precision countersink of the component. The camera may be disposed within a periscopic tube and may operate in one or more luminance environments. The camera may be used to differentiate characteristic features, including hole and countersink, against their intersection with the component. Positional and process refinement parameters may be calculated for one or more numerically controlled mechanisms based on the collected at least a first image. The positional and process refinement parameters may be fed back to provide adaptive control of the one or more numerically controlled mechanisms.

According to yet another aspect, a method for measuring dimensionality of a component may include collecting at least a first plurality of images from a first camera of a first precision countersink of the component. Each of the plurality of images may be collected using a different light source. A composite image of the first precision countersink may be generated using the first plurality of images. Positional and process refinement parameters may be calculated for one or more numerically controlled mechanisms associated with the first precision countersink, based on dimensionality of the first precision countersink in the generated composite image. The positional and process refinement parameters may be fed back to provide adaptive control of the one or more numerically controlled mechanisms.

The features, functions, and advantages that have been discussed can be achieved independently in various embodiments or may be combined in yet other embodiments, further details of which can be seen with reference to the following description and drawings.

BRIEF DESCRIPTION OF SEVERAL VIEWS OF THE DRAWINGS

Preferred and alternate embodiments of the present disclosure are described in detail below with reference to the following drawings, which are not necessarily drawn to scale.

DETAILED DESCRIPTION

Figure 1A:
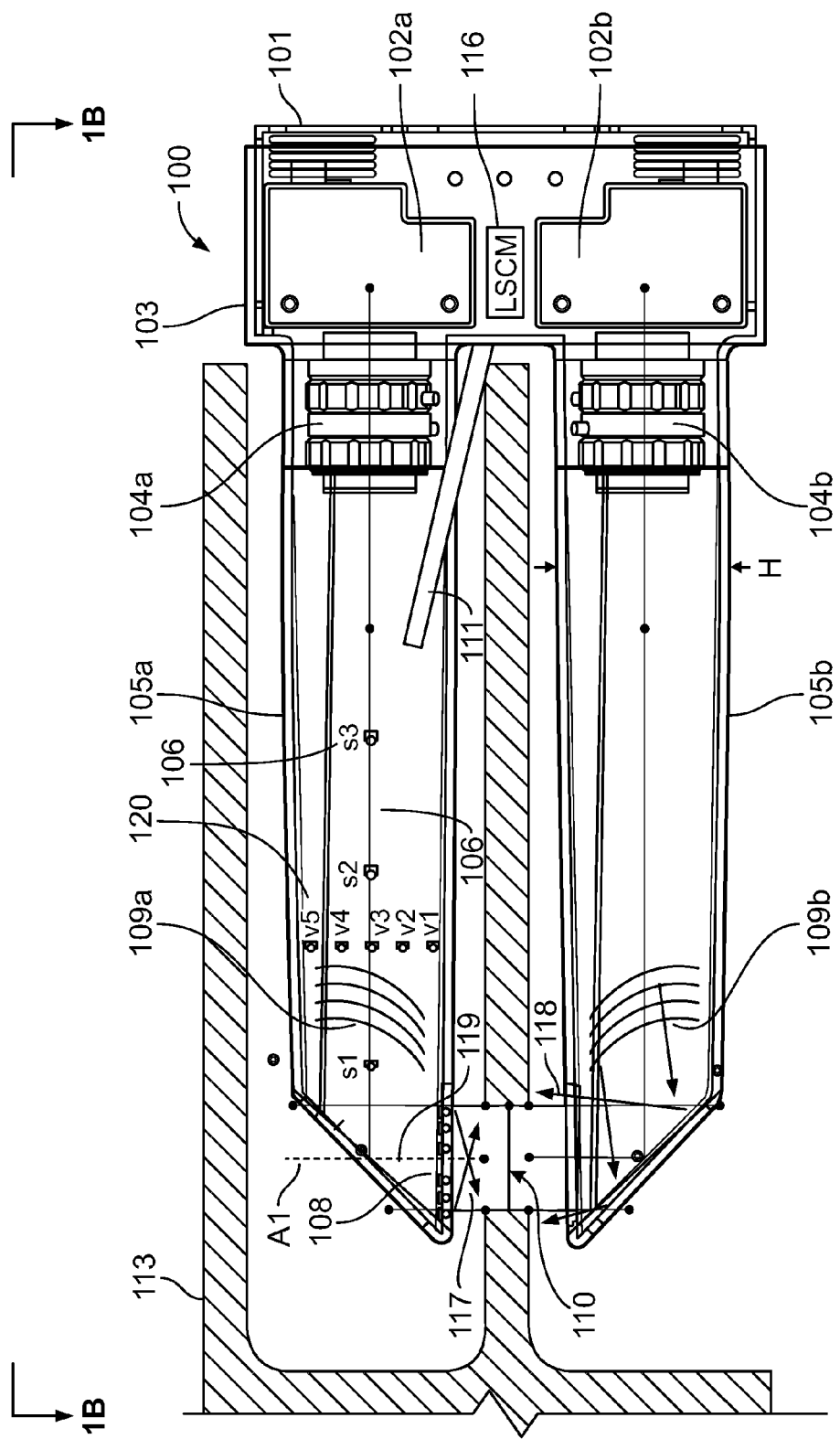
FIG. 1A is an illustration of a dual periscopic machine vision client (DPMVC), in accordance with an exemplary embodiment.

Certain aspects of the disclosure may be found in a method and apparatus for inspection of precision countersinks in metal structures by machine vision. Many specific details of certain embodiments are set forth in the following description as well as the drawings to provide a thorough understanding of such embodiments. One skilled in the art, however, will understand that the present disclosure may have additional embodiments, or it may be practiced without several of the details described in the following description. Like numbers refer to like elements throughout.

Exemplary important components for the manufacture of an aircraft are the titanium double-plus wing chord and the wing splice plate. Both of these production parts are the joining and load-bearing members bringing the aircraft body and the wing together at the wing box location of the aircraft body. The double-plus wing chord and the wing splice plate are responsible for transitioning the force from the wings into the body structure. Naturally, both of these production parts have multiple surfaces with a plurality of precision machined holes with precision countersinks Precision of the countersinks is usually ensured by manually adjusting the countersink cutter depth stop. The process of the initial adjustment of the cutter depth stop, which adjustment derives from evidence taken from countersinks cut into coupon material and quantified by calipers, is performed manually and is repeated until the countersink is determined to be within designed engineering tolerance of, for example, +/−0.0508 mm (0.002 inches). Thereafter, the countersinks on production parts are generated automatically and are assumed to be characteristic, within the range of the engineering tolerance, of coupon results. Nevertheless, the finished article must be verified to meet the designed requirements for the part.

By a unique application of timing image acquisition between cameras under specific and synchronized structured lighting in the backfield and in the light and dark field within a dual periscopic machine vision client (DPMVC), specific characteristics (e.g., precision features such as precision countersinks, upset rivets, and sealed fasteners) can be brought into sharp contrast, while distractive features, such as cutter chatter, endmill flute marks and ambient luminance, are diffused or rejected to below threshold minima. In this regard, the precision features, critical to the function of wing-to-body assembly or other manufacturing processes, may be correctly and quantitatively assessed, with results recorded, for compliance and conformance to related specifications, and/or subsequent adjustment of a mechanism controlling implementation or correction of the precision feature.

In instances when the DPMVC is incorporated on a numerically controlled mechanism, such as a CNC mill, a robotic manipulator or another deploying mechanism, the inspection of the desired feature (e.g., precision countersinks, upset rivet, etc.) may be autonomous and may be performed during the relevant machine process (e.g., in the process of countersink generation) with the results of each inspection being used to coordinate position and compensate for dimensional drift, as in cutter wear, surface abnormality or minor part distortion. In this regard, the ergonomic concern is removed as human intervention can be optionally employed at a remote control terminal, where successive results, as images, graphic meters, and numerical results, can be easily observed. This leads to increased production rates, 100% in-process inspection, automated feedback and adjustment of precision machining, a clear visible record of every feature and the near elimination of subsequent inspection processes relative to these desired features.

Figure 1B:
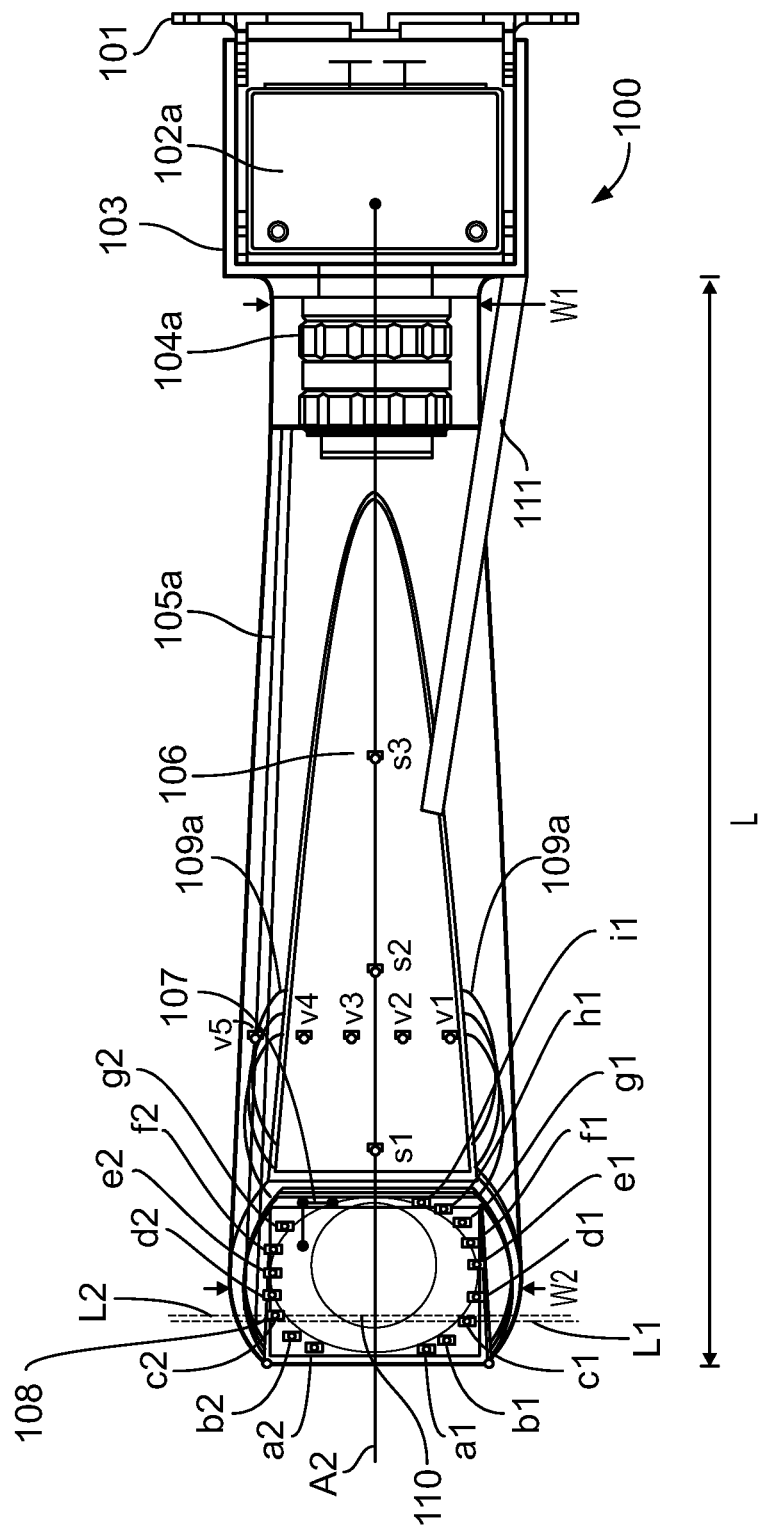
FIG. 1B is a top view of the DPMVC of FIG. 1A, illustrating a plurality of structured light sources within the top periscope, in accordance with an exemplary embodiment.
Figure 1C:
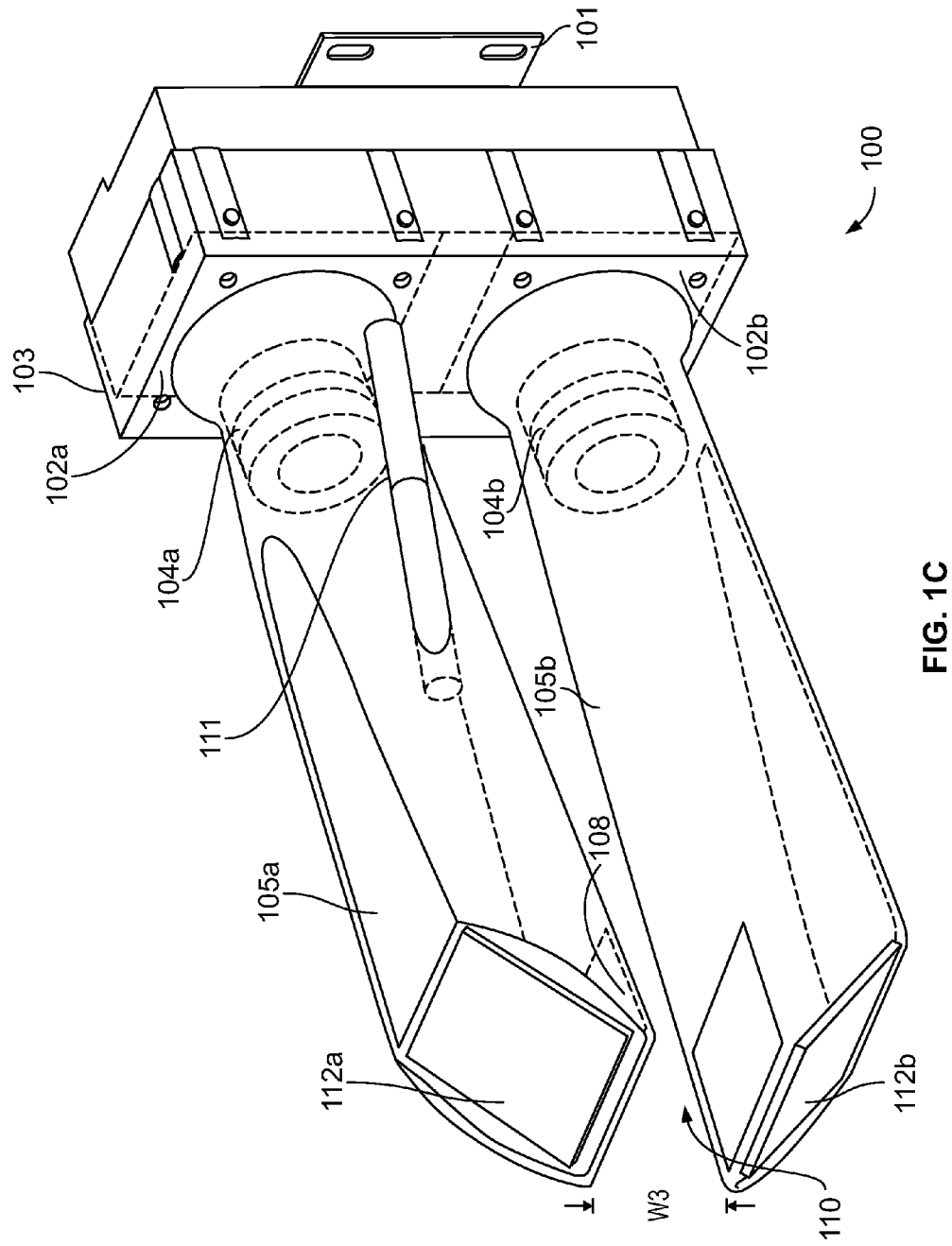
FIG. 1C is an isometric view of the exemplary DPMVC of FIG. 1A, in accordance with an exemplary embodiment.

FIG. 1A is an illustration of a dual periscopic machine vision client (DPMVC), in accordance with an exemplary embodiment. FIG. 1B is a top view of the DPMVC of FIG. 1A, illustrating a plurality of structured light sources within the top periscope, in accordance with an exemplary embodiment. FIG. 1C is an isometric view of the exemplary DPMVC of FIG. 1A, in accordance with an exemplary embodiment.

Referring to FIGS. 1A-1C, there is illustrated a DPMVC 100 in various views. The DPMVC 100 may comprise a housing 101, cameras 102a-102b, periscope base 103, camera lenses 104a-104b, periscope tubes (or top-bottom periscopes) 105a-105b, and a light source control module (LSCM) 116. The DPMVC 100 may further comprise a plurality of structured light sources, such as a structured shape light projector 111, an axial translational light source 106, a low-angle circumferential light source 108, a diffuse louvered direct light source 109a (in the top periscope 105a), and a diffuse louvered direct light source 109b (in the bottom periscope 105b). Even though FIG. 1 illustrates an axial translational light source 106 and a low-angle circumferential light source 108 in the top periscope 105a, the present disclosure may not be limiting in this manner. More specifically, the bottom periscope 105b may utilize the same structured light sources (a structured shape light projector, an axial translational light source, a low-angle circumferential light source, and a diffuse louvered direct light source) as used within the top periscope 105a.

The housing 101 may comprise a camera utility box (for containing the two cameras 102a-102b) and an adapter interface (for mounting the DPMVC 100 to a deploying mechanism). The housing 101 also contains the optical and electronic components of the LSCM 116, as well as provides structure on which to support the periscope base 103 and the periscopes 105a-105b.

The cameras 102a-102b can be any digital camera with sufficient image resolution, which can be used for capturing and transmitting data from their image sensors to an image processor (e.g., the LSCM 116 and/or to an external machine vision image processor, MVIP, which is described in reference to FIG. 2 herein below). The cameras 102a-102b may also be used to provide interface to light source control electronics (e.g., LSCM 116), controlling any of the structured light sources 106, 108, and/or 109. Each of the cameras 102a-102b may use corresponding camera lenses 104a-104b, which are configured to magnify, stop-down, focus light from the object space 110 onto the respective image sensor, and/or defocus and therefore mute contrast of objects before and beyond the object space (field of focus) 110.

The periscope base 103 mounts to the camera utility box 101, forming a foundation and load-bearing structure for the periscopes 105a-105b. The periscopes 105a-105b may each comprise one or more mirrors (e.g., mirrors 112a-112b), and may be used to contain and protect the camera lenses 104a-104b and the structured light sources (the structured shape light projector 111, the axial translational light source 106, the low-angle circumferential light source 108, and the diffuse louvered direct light sources 109a-109b). Additionally, if one of the periscopes is in use to take images (e.g., top periscope 105a), the remaining periscope (e.g., 105b) may be used to activate any of its structured light sources so as to block any ambient light sources from the active image sensor of camera 102a.

The axial translational light source 106 may comprise a co-linear array of spectral light sources (e.g., LEDs s1-s3) or a spectral light source translated axially by a mechanism for characterizing and revealing, presence or absence of spectral behavior, concavity, and convexity in the object surface 110.

In an exemplary embodiment, the axial translational light source 106 may comprise a plurality of multi-colored surface mounted LEDs s1, s2, and s3, which are disposed axially, along a central axis A2 of the top periscope 105a (which is also a central axis for the first camera 102a and its lens 104a) (FIG. 1B). For example and in reference to FIGS. 1A-1B, the axial translational light source 106 is illustrated with three LEDs s1-s3. Even though only three LED positions are illustrated in FIGS. 1A-1B, the disclosure is not limiting in this regard and more than three LEDs may be utilized as the axial translational light source 106.

In another embodiment, the axial translational light source 106 may comprise a single LED (e.g., LED s1), which may be disposed along the central image axis A2 of the top periscope 105a using a translating mechanism that translates (or moves) the LED s1 toward and away from the object space 110. In yet another embodiment, the axial translational light source 106 may utilize a fiber-optic cable implementation in place of the LEDs s1-s3. Notwithstanding the type of LED implementation, as each of the three LEDs s1-s3 is activated, or as the single LED s1 is translated along the central axis A2 (along the three positions of the dotted arrow 106 in FIG. 1A-1B), different angles of light may return to the image sensor of camera 102a, which may enable characterizing the type of machine surface present within the object space 110.

In yet another embodiment, the translational light source within the top periscope 105a of the DPMVC 100 may comprise an orbital translational light source 120. More specifically, the orbital translational light source 120 may comprise a plurality of multi-colored surface mounted LEDs v1-v5, which are disposed orbitally on the inside of the top periscope 105a. Still in another embodiment, the orbital translational light source 120 may comprise a single multi-colored surface mounted LED (e.g., LED v1), which may be configured to be rotatable around the inside of the top periscope 105a. The functionality of the orbital translational light source 120 may be the same as the functionality of the axial translational light source 106.

Figure 1D:
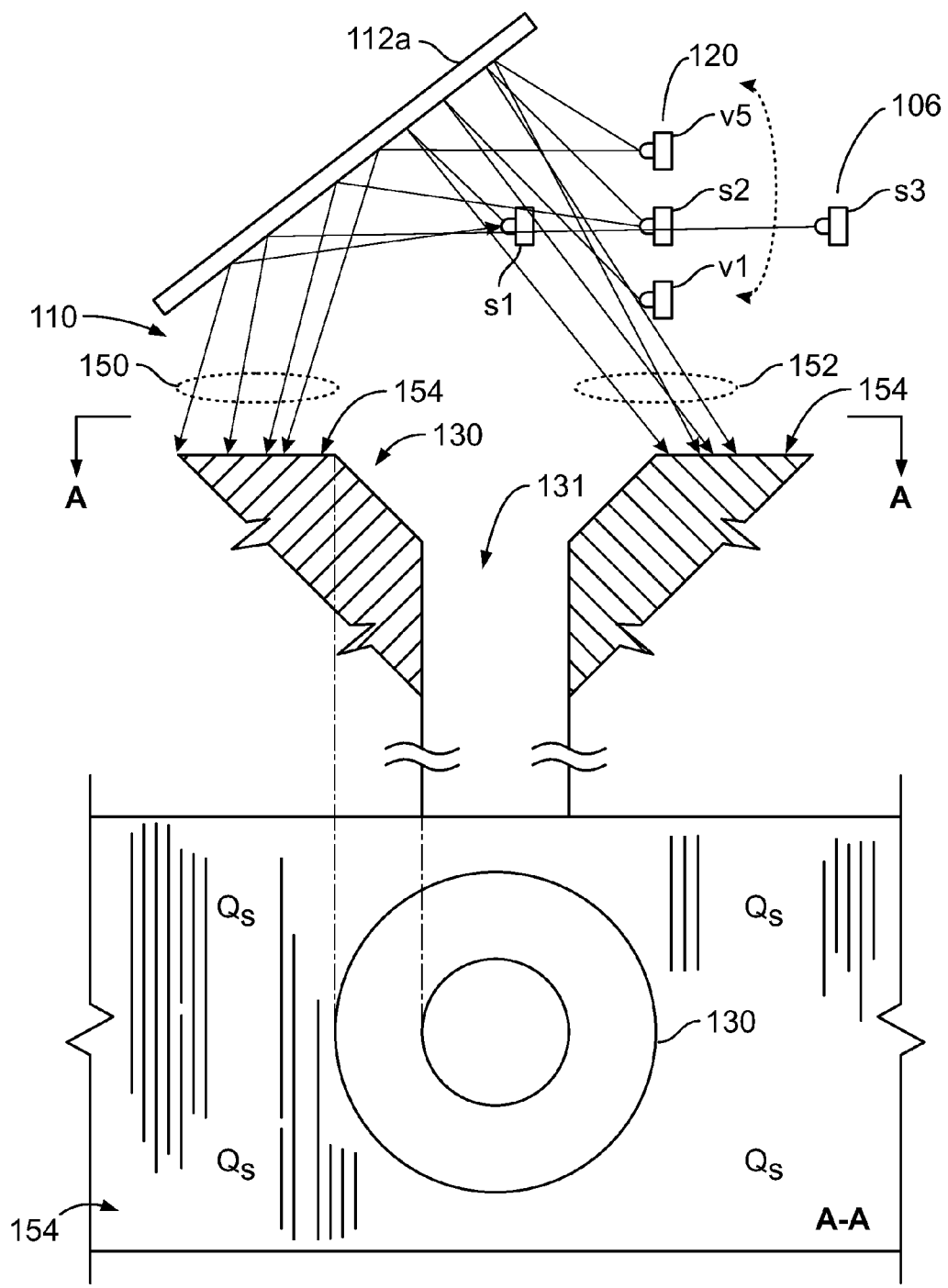
FIG. 1D is an illustration of using an orbital translational light source and an axial translational light source within the DPMVC of FIG. 1A, in accordance with an exemplary embodiment.

FIG. 1D is an illustration of using an orbital translational light source and an axial translational light source within the DPMVC of FIG. 1A, in accordance with an exemplary embodiment. Referring to FIG. 1D, there is illustrated an exemplary component 113 located within the object space 110. The component 113 includes a precision countersink 130, which may be disposed under the end-optic mirror 112a of the top periscope 105a. In operation, the axial translational light source 106 may include LEDs s1-s3, which may provide illumination 150 and 152. After being reflected off of the end-optic mirror 112a, such illumination 150 and 152 may be used to illuminate the object surface 154 around the countersink 130 (illumination of the object surface 154 around the countersink 130 is designated as Qs in the top view A-A of FIG. 1D). In another embodiment, the orbital translational light source 120 may be used in place of the axial translational light source 106 (FIG. 1D illustrates only two, v1 and v5, of the five LEDs v1-v5 for the orbital translational light source 120). For example, as seen in FIG. 1D, illumination Qs may be achieved only using LEDs from the orbital translational light source 120, such as LEDs v1 and v5. The illumination Qs of the object surface 154 may be varied by varying the intensity of the LEDs within the orbital translational light source 120 or the axial translational light source 106. In this regard, the object surface 154 may be muted in contrast for any subsequent images of the countersink 130, so that a more clear image of the countersink 130 may be taken.

The structured shape light projector 111 may comprise a laser that is configured to project a focused shape or pattern, which can be predictably and accurately distorted depending on specific and unique height and angle of the periscope 105a in relation to the object space 110. In one embodiment, the structured shape light projector 111 may be used to determine normality of a central image axis (e.g., axis 119, indicated as A1 in FIG. 1A) in relation to the object surface (e.g., 154 in FIG. 1D) within the object space 110. For example, referring to FIG. 1B, the structured shape light projector 111 may be configured to project a 3-dot L-pattern 107 onto the object surface 154 within the object space 110. In instances when the field of view of the DPMVC 100 is not normal in relation to the object surface 154 (i.e., the central image axis A1 is not perpendicular to the object surface within the object space 110), then the 3-dot L-pattern will be distorted. A position adjustment may then be triggered by the deploying mechanism of the DPMVC 100 until normality in relation to the object surface 154 is established. Even though a 3-dot L-pattern is illustrated in FIG. 1B, the present disclosure may not be limiting in this regard, and other types of structured shapes (e.g., any 4-dot pattern, such as a square or a "+" pattern) may be triggered by the structured shape light projector 111.

Figure 1E:
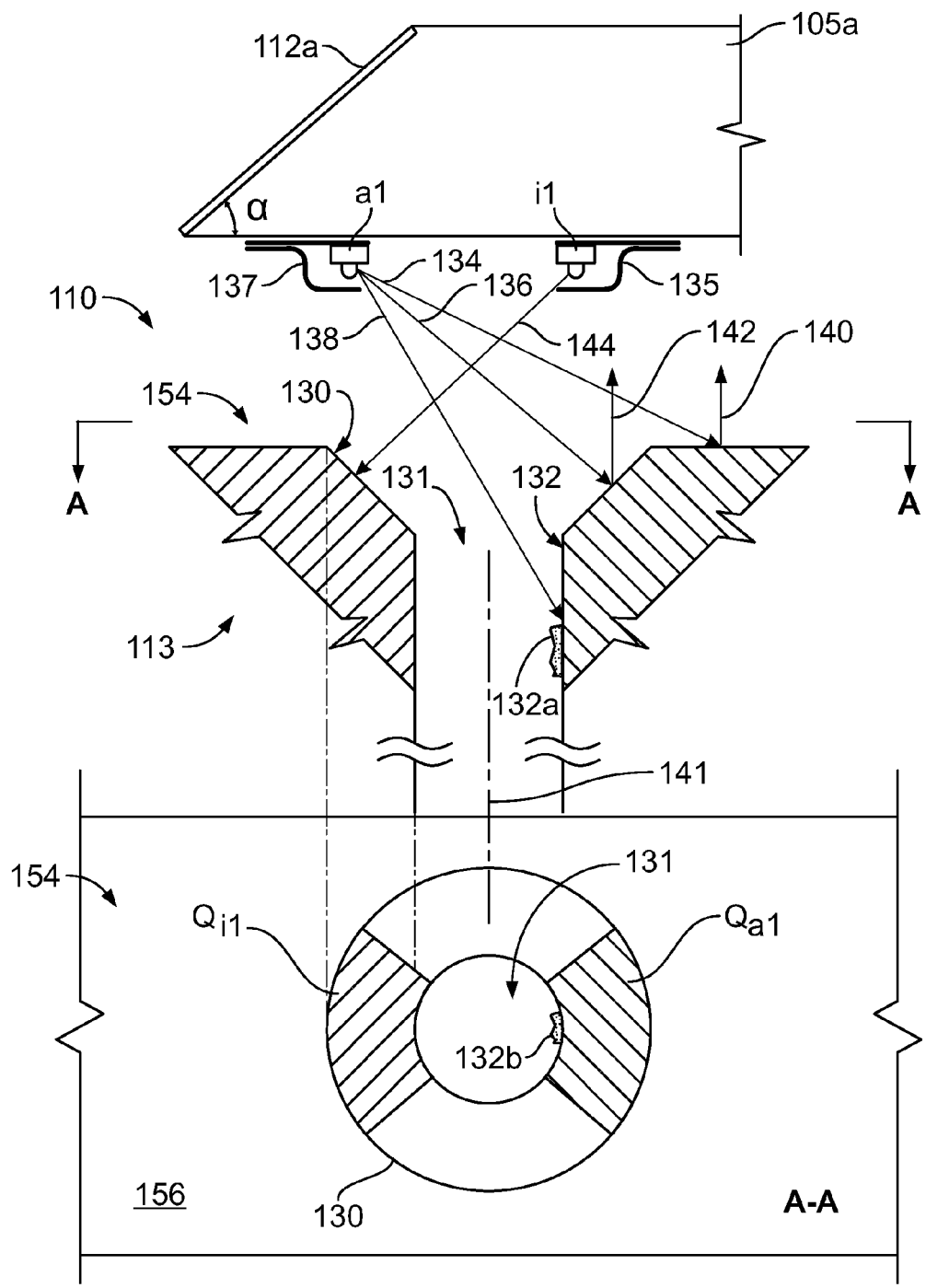
FIG. 1E is an illustration of using a low-angle circumferential light source within the DPMVC of FIG. 1A, in accordance with an exemplary embodiment.

FIG. 1E is an illustration of using a low-angle circumferential light source within the DPMVC of FIG. 1A, in accordance with an exemplary embodiment. Referring to FIGS. 1B and 1E, the exemplary low-angle circumferential light source 108 comprises a lower array of LEDs a1-i1, and an opposite array of LEDs a2-g2. The number of LEDs in the low-angle circumferential light source 108 is arbitrary. Additionally, for each opposite pair of LEDs, the two LEDs are not disposed exactly opposite of each other. For example, for LED pair c1-c2, if L1 is the vertical axis through LED c1 and L2 is the vertical axis through LED c2 (L1 and L2 are both perpendicular to a central axis A2 of the top periscope 105a), then both L1 and L2 are not co-linear (i.e., do not intersect with each other).

Each of the LEDs a1-i1 and a2-g2 within the low-angle circumferential light source 108 may be adapted to partially illuminate, at acute angle, the hole 131, the countersink 130 and the component surface 154 from just beyond the object space (110) center line (141), in opposite direction. In reference to FIG. 1E, the LED a1 may be partially covered by a hood (or baffle) 137, and the LED i1 may be partially covered by a hood 135. In this regard, when the LED a1 is activated, it may cast illumination (e.g., illumination portions 134, 136, and 138 of the entire illumination cast by LED a1)) only at an acute angle from just beyond the object space center line 141 (remaining illumination is being blocked by the hood 137). More specifically, illumination portion 138 partially illuminates the hole 131 and the hole wall 132. Illumination portion 136 partially illuminates countersink 130, and illumination portion 134 partially illuminates component surface 154. Illumination 142 (which results from reflecting of illumination portion 136 off of the countersink 130) may be conditioned by the illumination portions 136 and 138 (of the hole 131, hole wall 132 and countersink 130), and may be reflected back to the top periscope 105a. Similarly, illumination 140 may be conditioned by illumination portion 134 (of the component surface 154) and may be also reflected back to the top periscope 105a and detected by the lens 104a of camera 102a. The camera 102a may then generate image 156 of the partially illuminated chamfer 130 and the hole 131, based on the illuminations 140 and 142. The partial illumination of the countersink 130 based on illumination portion 136 from LED a1 is designated as Qa1 in the image 156. Similarly, partial illumination of the countersink 130 based on illumination portion 144 from LED i1 is designated as Qi1 in the image 156.

In an exemplary embodiment, illumination 138 of the hole 131 and the hole wall 132 may be used to detect imperfections (e.g., irregular machine marks) on the hole wall. For example, during an exemplary hole 131 and precision countersink 130 inspection, LED a1 can cast controlled luminance (e.g., illumination 138) across at an acute angle, beyond the object space (110) center line 141. In this regard, the LED a1 can be used to greatly contrast irregular machine marks (e.g., 132a) in the hole wall 132. This results in the low-angle circumferential light source 108 casting, in great relief, a geometric witness (e.g., 132b) of the irregular machine marks 132a, while utilizing the highly reflective machined surface 154 into which the hole 131 is cut, to reject illumination in the perspective of the camera 102a and lens 104a. The resulting geometric witness 132b (seen in the top view image 156 in FIG. 1E) of the irregular machine marks 132a (seen in the component side view in FIG. 1E) can be detected by the camera 102a and reflected in the image 156.

Figure 1F:
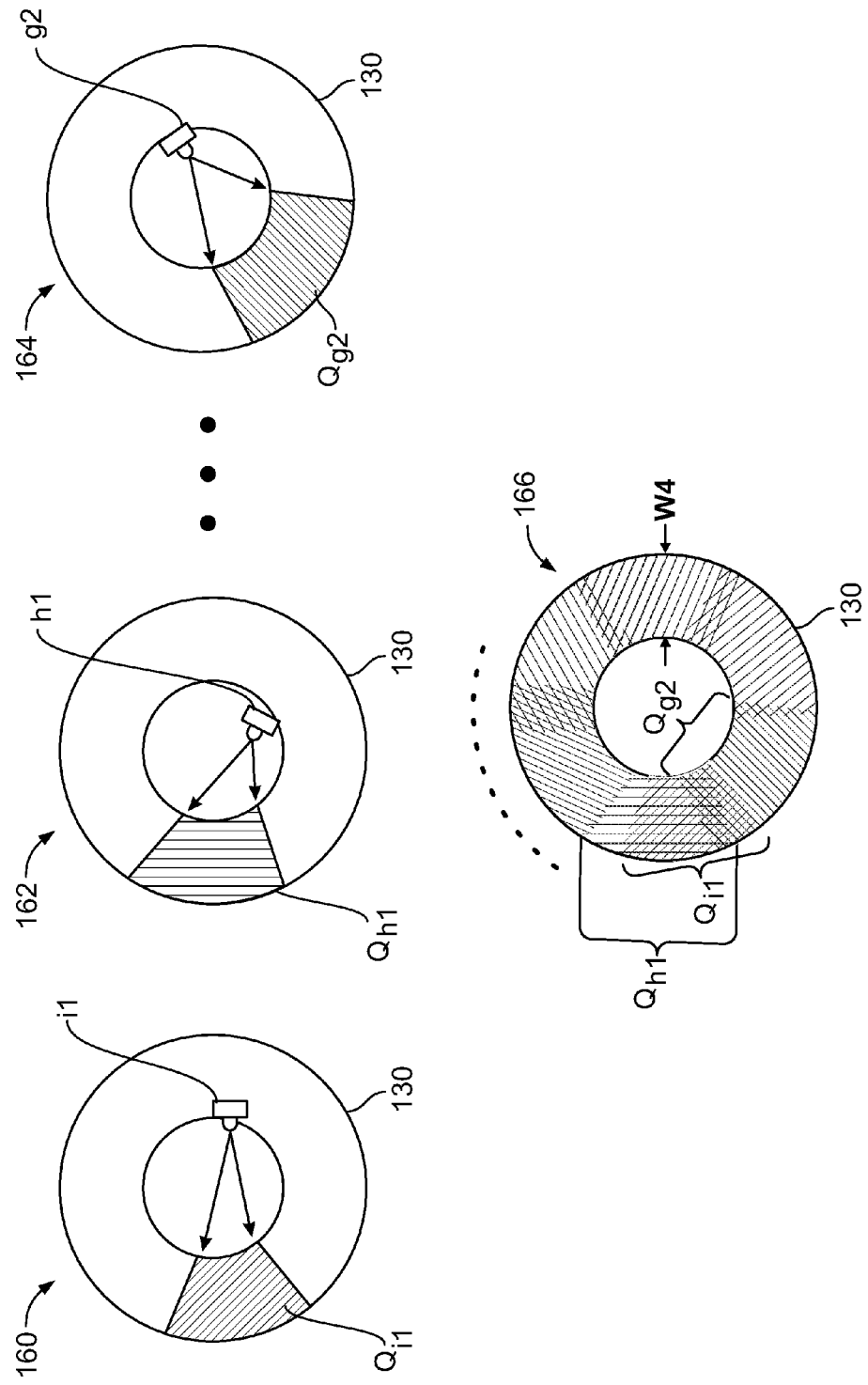
FIG. 1F is an illustration of generating a final composite image of a countersink using the low-angle circumferential light source within the DPMVC of FIG. 1A, in accordance with an exemplary embodiment.

FIG. 1F is an illustration of generating a final composite image of a countersink using the low-angle circumferential light source within the DPMVC of FIG. 1A, in accordance with an exemplary embodiment. Referring to FIGS. 1B, 1E and 1F, when the periscope 105a is positioned above the hole 131, the LEDs a1-i1 and a2-g2 within the low-angle circumferential light source 108 are positioned in non-opposing radial configuration around the hole 131 and countersink 130 within the object space 110.

When each of the LEDs a1-i1 and a2-g2 within the low-angle circumferential light source 108 is sequentially turned on, there is sufficient overlapping coverage of illuminated portions of the countersink 130 so that a composite image 166 of the countersink 130 may be generated using the overlapping illuminated portions of the countersink 130. More specifically, referring to FIG. 1F, LED i1 may be activated, while the remaining LEDs within the low-angle circumferential light source 108 may remain inactive. The activated LED i1 may partially illuminate portion Qi1 of the countersink 130, and the illuminated portion Qi1 may be captured by the camera 102a in an image 160 (a more detailed description of the partial illumination of the countersink 130 is described above in regards to FIG. 1E).

After the image 160 of the partially illuminate portion Qi1 of the countersink 130 is generated, the LED i1 may be deactivated and the next LED h1 may be activated. The activated LED h1 may partially illuminate portion Qh1 of the countersink 130, and the illuminated portion Qh1 may be captured by the camera 102a in an image 162. After the image 162 of the partially illuminate portion Qh1 of the countersink 130 is generated, the LED h1 may be deactivated and the next LED g1 may be activated. This process of selective activation of the LEDs within the low-angle circumferential light source 108 may continue in a clockwise direction, from LED g1 all the way to LED g2, activating a single LED at a time and taking an image of the partially illuminated countersink 130 associated with each LED. When the last LED g2 is activated, it may partially illuminate portion Qg2 of the countersink 130, and the illuminated portion Qg2 may be captured by the camera 102a in an image 164.

In an exemplary embodiment, after the camera 102a generates individual images 160, 162, . . . , 164 of the illuminated portions Qi1, Qh1, . . . , Qg2 of the countersink 130, such illuminated portions may be combined into a composite image 166. More specifically, as seen in FIG. 1F, each illuminated portion (e.g., Qi1) partially overlaps with the next illuminated portion (e.g., Qh1). In this regard, by superimposing all illuminated portions Qi1, Qh1, . . . , Qg2, a composite image 166 of the entire countersink 130 may be generated. Additionally, various characteristics of the countersink 130 may be assessed based on the composite image 166. For example, after the composite image 166 of the entire countersink 130 is generated, the current width W4 of the countersink 130 may be determined. Based on the determined width W4, one or more corrective parameters may be generated and may be used for adjusting the width W4 of the countersink 130 (as explained further herein below in reference to FIG. 3).

Figure 1G:
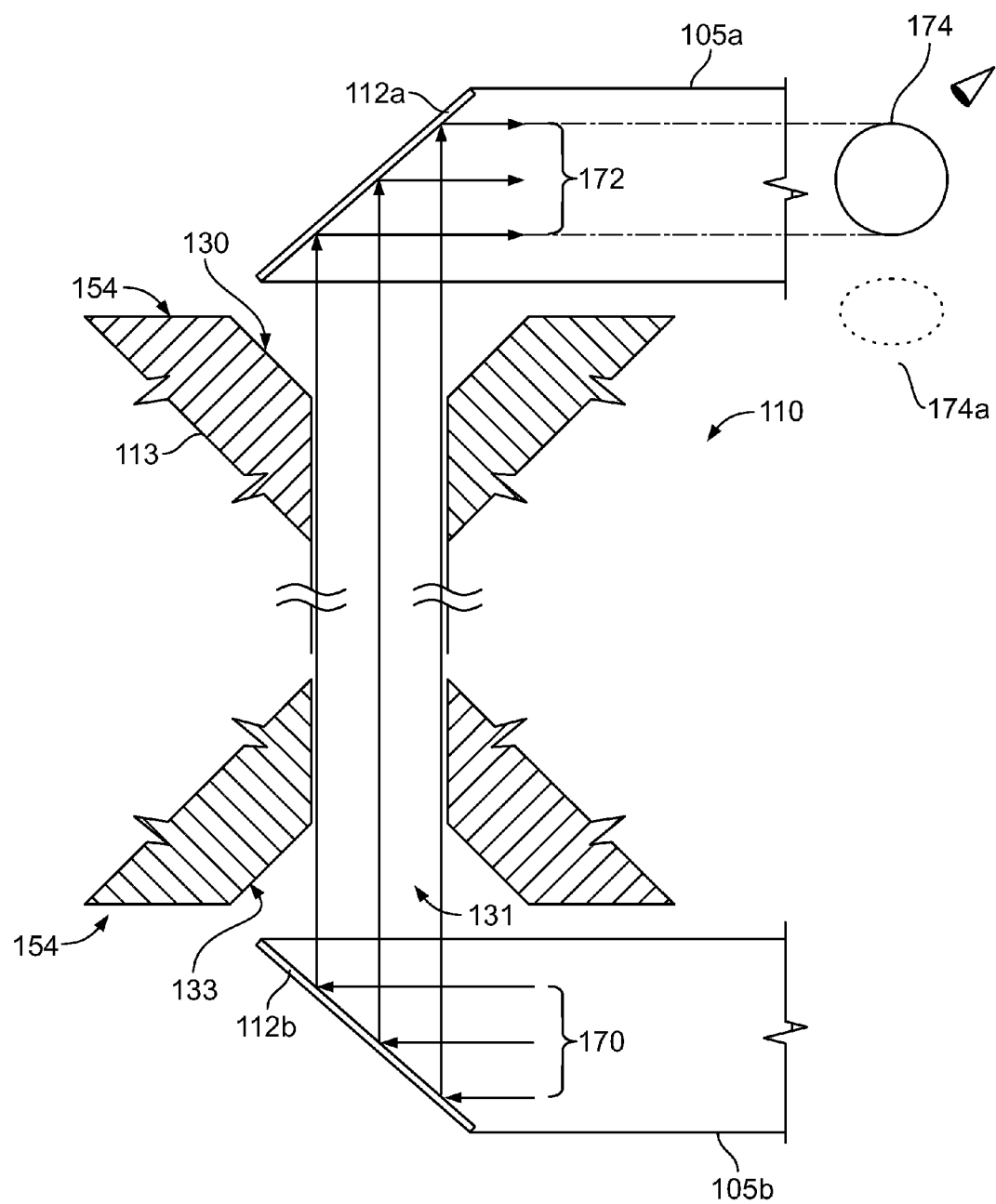
FIG. 1G is an illustration of using backlighting within the bottom periscope of the DPMVC of FIG. 1A, in accordance with an exemplary embodiment.

FIG. 1G is an illustration of using backlighting within the bottom periscope of the DPMVC of FIG. 1A, in accordance with an exemplary embodiment. Referring to FIGS. 1A-1G, the backlighting within the bottom periscope 105b may be provided as illumination 170 by the diffuse louvered direct light source 109b (e.g., as seen in FIG. 1A) (or by an orbital translational light source, such as 120, or an axial translational light source, such as 106, but within the bottom periscope 105b, as all seen in FIG. 1A). The diffuse louvered direct light source 109b within the bottom periscope 105b (and the diffuse louvered direct light source 109a within the top periscope 105a) may comprise louvered light sources used to flood the object space 110 (as seen in FIG. 1G) with direct, diffuse light (e.g., illumination 170) to mute contrast in machine textured surfaces (e.g., object surface 154, surrounding the countersinks 130 and 133, as seen in relation to FIG. 1D and image 182 in FIG. 1H). During an exemplary hole 131 and precision countersink 130 inspection with the camera 102a, diffuse luminance in the backfield (e.g., luminance 118 from source 109b in FIG. 1A or luminance 170 in FIG. 1G), relative to the camera 102a, casts a clear witness (e.g., image 174) of the hole 131 within the object space 110.

More specifically, backlighting within the bottom periscope 105b (such as the diffuse louvered direct light source 109b) generates illumination 170. After the illumination 170 is reflected by the end-optic mirror 102b, it passes through the hole 131 and is again reflected by the top end-optic mirror 102a as illumination 172. The reflected illumination 172 may be received by the camera 102a, which may generate the image 174. The image 174, generated based on the backlighting illumination 170 within the bottom periscope 105b, may be used to monitor the position of the DPMVC 100 as it moves over the hole 131 for purposes of inspecting the countersinks 130 and 133. Namely, after the backlighting illumination 170 within the bottom periscope 105b is activated, the image 174 may be monitored until a clear circle is visible (as seen in FIG. 1G). Such circle in image 174 would indicate that the bottom periscope 105b and the top periscope 105a are positioned above the hole 131, thereby fully illuminating the cylindrical opening of hole 131 resulting in the visible circle in image 174. In this regard, a visible circle 174 may indicate that the reflection of the backlighting illumination 170 by the end-optic mirror 112b is either parallel or substantially parallel to the object space center line 141 (FIG. 1E).

In instances when the image 174 does not show a circle, additional positional corrections may be required before inspecting the countersink 130. For example, if the hole 131 is drilled perpendicular to the surface 154 (as illustrated in FIG. 1G) and the camera 102a generates an ellipse 174a (and not a circle 174), a positional correction of the periscopes 105a-105b may be required. More specifically, an ellipse 174a may indicate that the bottom periscope 105b and the top periscope 105a are not positioned exactly above the hole 131. In such instance, positional correction may be generated by the MVIP 122 and the position of the DPMVC 100 may be further adjusted (by moving the DPMVC 100 and its periscopes 105a-105b parallel to the object surface 154) until a circle is visible in image 174.

Under other circumstances, the hole 131 may be drilled at an angle (i.e., the hole 131 is not perpendicular to the surface 154). In such instance, the camera 102a may also generate an ellipse 174a (and not a circle 174), and a different positional correction of the periscopes 105a-105b may be required. More specifically, if the hole 131 is drilled at an angle (in relation to the surface 154) and the camera 102a generates an ellipse 174a, then a rotational correction of the periscopes 105a-105b may be required. More specifically, the DPMVC 100 and its periscopes 105a-105b may be rotated clockwise or counterclockwise until the central image axis A1 (see e.g., FIG. 1A) is parallel with the object space center line 141 (FIG. 1E). Such rotational adjustment may be performed until a circle is visible in image 174. At this point, countersink 130 processing may proceed as described herein below.

Figure 1H:
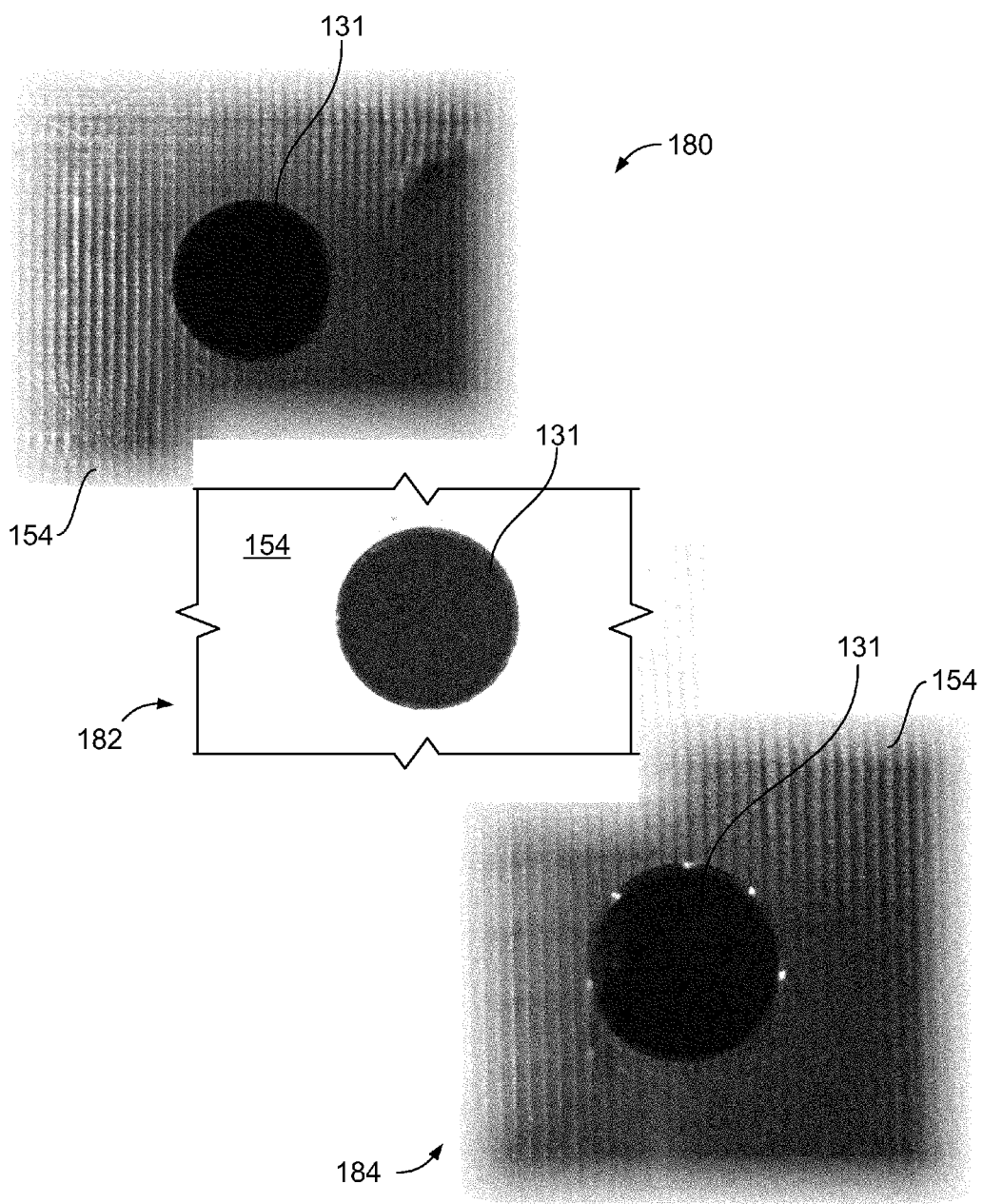
FIG. 1H is a compilation of photographs of a component hole and the surrounding object surface using various types of lighting, in accordance with an embodiment.

FIG. 1H is a compilation of photographs of a component hole and the surrounding object surface using various types of lighting, in accordance with an embodiment. Referring to FIG. 1H, there are illustrated photographs of the hole 131 using the top periscope camera 102a under different types of lighting environments. For example, photograph 180 illustrates the component hole 131 and the surrounding object surface 154, in instances when the object surface 154 and the hole 131 are lit using ambient lighting (e.g., regular room lighting, which is not provided by the DPMVC 100). Photograph 184 illustrates the component hole 131 and the surrounding object surface 154, in instances when the object surface 154 and the hole 131 are partially lit using the low-angle circumferential light source 108. Finally, photograph 182 illustrates the component hole 131 and the surrounding object surface 154, in instances when the object surface 154 and the hole 131 are lit using the diffuse louvered direct light source 109a. As seen in FIG. 1H, the diffuse louvered direct light source 109 can be used to greatly mute in contrast the object surface 154 within the object space 110 (see e.g., image 182; note surface 154 around hole 131 is white, which is meant to indicate the muted surface). In this regard, by muting the object surface 154, remaining light sources (e.g., the low-angle circumferential light source 108) can be used to light the hole 131 (as well as the countersink 130) so that a low-noise composite image of the countersink may be generated (e.g., as explained herein above in reference to FIG. 1F and as seen in image 166 in FIG. 1F).

The LSCM 116 comprises suitable circuitry and/or code, which is configured to control the structured light sources (e.g., the structured shape light projector 111, the axial translational light source 106, the low-angle circumferential light source 108, and the diffuse louvered direct light sources 109a-109b) in periscopes 105a-105b, respectively. More specifically, the LSCM 116 may control sequencing (or order of activation) of the structured light sources (as well as sequencing of the individual LEDs within each structured light source), pulse duration, voltage and current levels, exposure and sensor gain, and frame rate.

In operation, the DPMVC 100 may be used to inspect precision countersinks (130, 133 in FIGS. 1A-1G) of a component 113 (e.g., hole 131 and precision countersinks 130, 133). A deploying mechanism (or conveyance) (e.g., 114 in FIG. 2) may be used to deploy the DPMVC 100 so that a component feature that needs to be inspected (e.g., countersinks 130, 133) is disposed within the object space 110 of both cameras 102a-102b. The LSCM 116 (and/or a separate image processor, such as the machine vision image processor, MVIP, 122 in FIG. 2) may initiate collection of multiple images using one or more of the structured light sources within the top periscope 105a and/or the bottom periscope 105b. In this regard, both lens systems (104a-104b) will be focused to project maximum contrast of objects (e.g., precision countersinks 130, 133) located in the object space 110 onto the image sensors of cameras 102a-102b, and render object surface 154 (before and beyond the countersinks 130, 133) increasingly unfocused and, therefore, in muted contrast. For example, through image analysis and dynamic control of the structured light source sequencing, pulse duration, voltage and current levels, exposure and sensor gain, and frame rate by the LSCM 116, a determination may be made of the type of component surface and which combination of structured light sources to use in order to mute in contrast the object surface 154 within the object space 110 (muting of the object surface 154 in contrast is explained in more detail in reference to FIG. 1D herein above). Additionally, one or more of the structured light sources (e.g., 108) may be used to acquire an additional plurality of images (e.g., 160, 162, . . . , 164 in FIG. 1F), which after analysis, may provide a final composite image 166 of the objects (e.g., the precision countersink 130) located in the object space 110, quantifying compliance of such objects to design engineering dimension and tolerance (a more detailed explanation of generating the composite image 166 is provided herein above in reference to FIG. 1F).

Referring to FIGS. 1A-1C, the dimensions (e.g., height H, widths W1, W2, and length L) of periscopes 105a-105b, as well as the distance W3 between the two periscopes 105a and 105b within the object space 110, may vary in direct proportions relating to, for example, object space to be imaged, distance of object space to the camera sensors, lens (104a-104b) configuration necessary to adequately record the object (e.g., countersink 130) with sufficient image detail, image sensor resolution and respective camera body requirements for the cameras 102a and 102b.

In an exemplary embodiment, the length L of the periscopes 105a-105b may be about 272 mm, the height H may be about 47 mm, first width W1 may be about 48 mm, and second width W2 may be about 69 mm (in other words, the cross-sectional area of the periscope at its widest part, i.e. at width W2, may be about 32 sq·cm.). Additionally, the distance W3 between the two periscopes 105a and 105b may be about 36 mm. Even though these are exemplary dimensions, the present disclosure may not be limiting in this regard, and other dimensions of the periscopes 105a and 105b, the distance W3 between the periscopes 105a-105b, the periscope base 103, and the housing 101 may be used, based on the particular application and the particular cameras used for such application.

For example, in one embodiment of the present disclosure, the object space 110 may be greatly distanced from the cameras 102a-102b. In such instances, a corresponding increase in the length L of the periscopes 105a-105b may be required so as to position the end-optic mirrors (112a-112b) over the object space 110. In another embodiment, a change in the lens (104a-104b) selection may be required, which may result in new physical dimensions of the lens 104a-104b, and a corresponding modification to the dimensions of the periscopes 105a-105b in order to maintain the dark-field and bright-field functionality of the respective structured light sources (e.g., 106/120, 108, 109, and 111) in both periscopes 105a-105b.

In yet another embodiment, in instances when the periscopes 105a-105b need to observe larger objects, larger end-optic mirrors (112a-112b) may be required, and the angle of the mirrors (e.g., angle α in FIG. 1E) may have to be adjusted to image the object (e.g., component 113) in affine scale. Alternatively, the end-optic mirrors (112a-112b) may be concave or convex to apply respective scale necessary to image the component 113 (within the object space 110) in sufficient detail. Furthermore, in instances when periscope dimensions (of the periscopes 105a-105b) are constrained below respective requirements, the DPMVC 100 can be conveyed to multiple object coordinates, multiple images (e.g., 160, 162, . . . , 164 in FIG. 1F) may be captured, and then the collection of images (160, 162, . . . , 164) may be "stitched" together to obtain a final composite image (e.g., 166 in FIG. 1F).

Referring to FIGS. 1D-1H, the final composite image 166 may be used for quantifying compliance of the countersink 130 to design specifications, such as determining whether the countersink width W4 is within specification (as explained in greater detail herein above in reference to FIG. 1F). More specifically, if the countersink width W4 is over tolerance, this may indicate that the countersink 130 is too deep. Similarly, if the countersink width W4 is under tolerance, this may indicate that the countersink 130 is too shallow. Additionally, there may be instances when the hole 131 is drilled perpendicular to the surface 154 (and a circle is visible in image 174 in FIG. 1G), however, the countersink 130 may be drilled at an angle. In such instances, the composite image 166 will be characterized with varying width W4 (e.g., the width W4 will be at a maximum at one point, and at a minimum in the opposite point). Such deviation can still be detected by the MVIP 122 (FIG. 2) by analyzing the widths W4 around the entire countersink 130. If a variation in the width W4 is detected, then the countersink 130 may be deemed sub-par due to, for example, drilling at an angle or a defect in the drill bit.

Figure 1I:
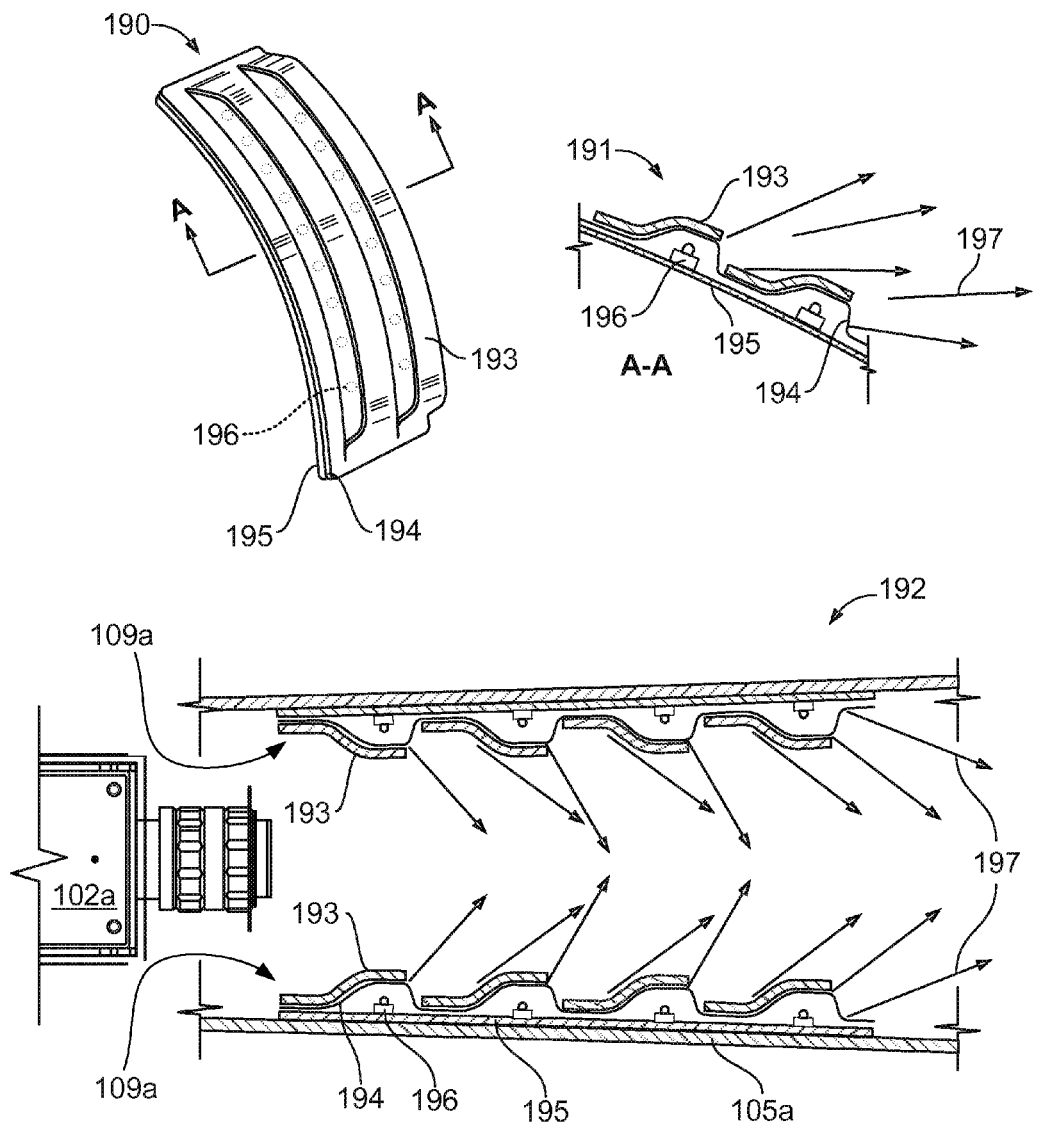
FIG. 1I is an illustration of using a diffuse louvered direct light source within the DPMVC of FIG. 1A, in accordance with an exemplary embodiment.

FIG. 1I is an illustration of using a diffuse louvered direct light source within the DPMVC of FIG. 1A, in accordance with an exemplary embodiment. Referring to FIG. 1I, there is illustrated a top view 192 of the diffuse louvered direct light source 109a within the top periscope 105a, as well as a partial perspective view 190 and a partial top view 191. The partial perspective view 190 and the partial top view 191 illustrate a portion of the diffuse louvered direct light source 109a for simplicity and ease of understanding the underlying structure. Four columns of LEDs 196 may be mounted on a circuit board 195. The circuit board 195 may be flexible or may be formed so it fits on the inside wall of the periscope 105a. After the LEDs 196 are mounted on the circuit board 195, a diffusing medium 194 is mounted on top of the LEDs 196, as seen in FIG. 1I. The diffusing medium 194 may be made of any light diffusing material, such as Plexiglas, Lexan, or resin-type material.

A hood 193 may be installed on top of the diffusing medium 194 and the circuit board 195. As seen in the partial perspective view 190 as well as the top view 192, the hood 193 may be a single piece with partial openings for the illumination 197 to come out and be directed towards the end-optic mirror 112a (FIG. 1C), away from the camera 102a. In this regard, by covering the LEDs 196 with the diffusing medium 194 and partially blocking each of the LEDs 196, diffuse, filtered illumination 197 may be generated by the diffuse louvered direct light source 109a. Additionally, as seen in the top view 192, two separate diffuse louvered direct light sources 109a may be used on opposite sides within the top periscope 105a. Furthermore, similar diffuse louvered direct light sources may be used within the bottom periscope 105b (FIG. 1A).

Figure 2:
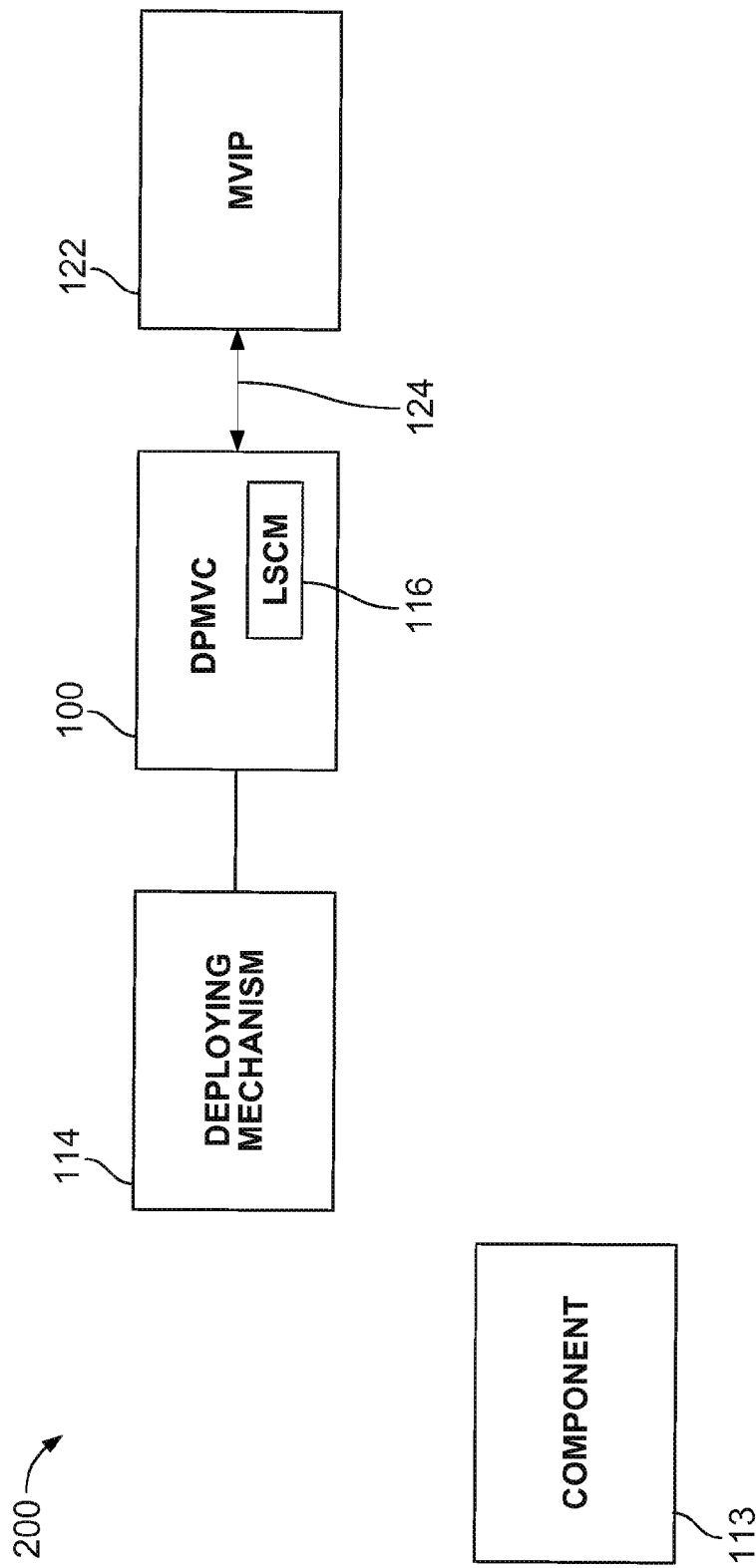
FIG. 2 is a block diagrammatic view of an exemplary manufacturing environment for using a DPMVC, in accordance with an exemplary embodiment.

FIG. 2 is a block diagrammatic view of an exemplary manufacturing environment for using a DPMVC, in accordance with an exemplary embodiment. Referring to FIG. 2, the manufacturing environment 200 may comprise a component 113 (e.g., a double-plus wing chord, a wing splice plate or other aircraft components), a deploying mechanism 114, a DPMVC 100 with an LSCM 116, and a machine vision image processor (MVIP) 122.

The deploying mechanism 114 may comprise suitable hardware used for deploying (conveying) the DPMVC 100, and may include a robot, a mobile platform, a mill, a conveyor, etc. Additionally, the deploying mechanism 114 may comprise additional tooling necessary to perform one or more machine processes, the results of which may be inspected and quantified by the DPMVC 100. For example, the deploying mechanism 114 may be used to drill precision countersinks, insert and install rivets, install fasteners (e.g., sealed fasteners, unsealed fasteners or interference fit fasteners), etc.

The MVIP 122 may comprise suitable circuitry and/or code and may be used to perform image analysis of images provided by the DPMVC 100, as well as control the functions performed by the LSCM 116. For example, the MVIP 122 may comprise a personal computer, a device controller or any other handheld or portable controller device, which may be communicatively coupled to the DPMVC 100 via a wired (and/or wireless) connection 124.

In an exemplary operation, the MVIP 122 may communicate specific sequences of commands and/or parameters to the DPMVC 100 and the LSCM 116 (i.e. pulse durations, voltage and current levels, exposure and sensor gain, order of execution of structured lighting and frame rate). The LSCM 116 and the DPMVC 100 may execute each sequence of commands and may return the resultant image frame(s) to the MVIP 122 for further processing. For example and in reference to FIG. 1F, the LSCM 116 may cause the LEDs a1-i1 and a2-g2 within the low-angle circumferential light source 108 to be sequentially turned on. Additionally, the LSCM 116 may cause the camera 102a to take images 160, 162, . . . , 164 of the illuminated portions Qi1, Qh1, . . . , Qg2 of the countersink 130. The LSCM 116 may then communicate the images 160, 162, . . . , 164 to the MVIP 122, which in turn may combine all illuminated portions Qi1, Qh1, . . . , Qg2, thereby generating the composite image 166 of the entire countersink 130.

As images 160, 162, . . . , 164 are analyzed by the MVIP 122 for feature detection and object classification for generating the composite image 166, they are also evaluated for quality and reliability with respect to any feature extraction/detection that is being performed (e.g., measuring the width W4 of the countersink 130 using the composite image 166). This evaluation may result in parameter refinement to improve each frame-type's utility to the final feature quantification, and can also mute specific sequences and parameters from subsequent command streams (e.g., muting a component surface 154, as explained in reference to FIGS. 1D-1H above and 4A-4B below).

Even though the MVIP 122 is illustrated as a separate processor, the present disclosure may not be limiting in this regard. In an exemplary embodiment, the MVIP 122 may be implemented within the DPMVC 100.

Various aspects of exemplary operations performed within the manufacturing environment 200 are disclosed herein below, with reference to FIGS. 3-5.

Figure 3:
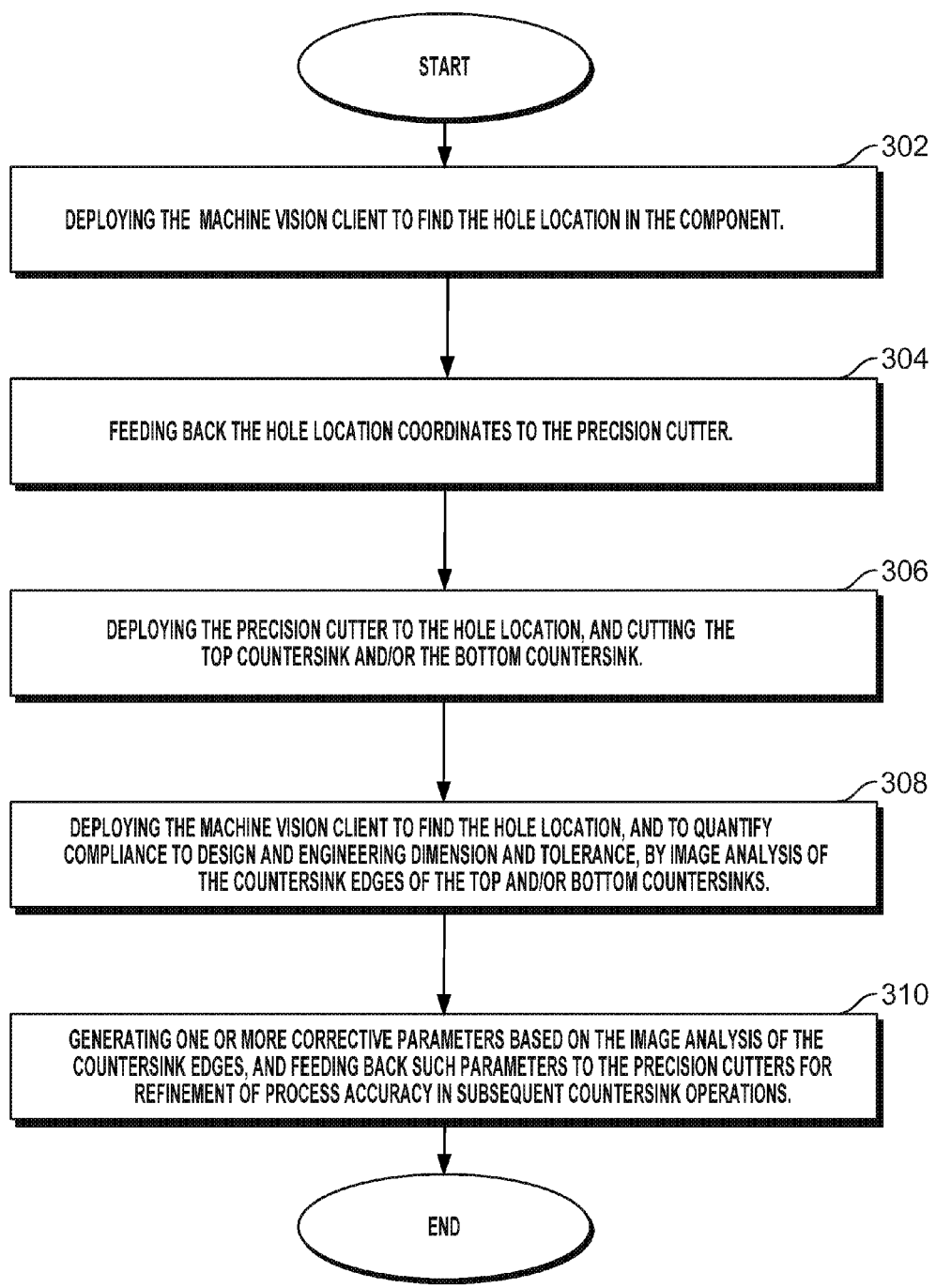
FIG. 3 is illustration of operations performed for inspecting precision countersinks using a DPMVC, in accordance with an exemplary embodiment.

FIG. 3 is illustration of operations performed for inspecting precision countersinks using a DPMVC, in accordance with an exemplary embodiment. Referring to FIGS. 1A-3, exemplary operations within the manufacturing environment 200 may begin at step 302, where the deploying mechanism 114 may deploy the DPMVC 100 to find a hole 131 location within the component 113. The deploying mechanism 114 (or conveyance) may coordinate the position of the object space 110 of the DPMVC 100 and the desired feature to be imaged and processed (e.g., the hole 131). The component feature may be moved into the object space 110 by conveying the feature of component 113, the DPMVC 100, or both. The deploying mechanism 114 may then signal the MVIP 122 to rough-find the desired feature using one or more images taken by the DPMVC 100 using one or more of the structured lighting sources previously described. For example, as explained above, FIG. 1G illustrates using backlighting within the bottom periscope 105b for purposes of positioning the DPMVC 100 so that the hole 131 (and countersink 130) are positioned directly under the end-optic mirror 112a within the object space 110.

At 304, after the MVIP 122 locates the hole 131, the location coordinates of the hole 131 are communicated to the precision cutter, which may be part of the deploying mechanism 114. At 306, the precision cutter may be deployed to the hole 131 location, and the top countersink and/or the bottom countersink (if the hole 131 is a dual countersink hole) may be cut. At 308, the DPMVC 100 may be deployed to find the hole 131 location, and to quantify compliance of the cut precision countersinks (e.g., countersink 130) to design and engineering dimension and tolerance, by image analysis of the countersinked edges of the top and bottom countersinks (a more detailed description of the quantification process is provided herein below in reference to FIGS. 4A-6B).

At 310, the MVIP 122 may generate one or more corrective parameters based on the image analysis of the countersink 130, and may communicate such parameters to the precision cutters within the deploying mechanism 114, for refinement of process accuracy in subsequent countersink operations. For example, as explained above in reference to FIG. 1F, the LSCM 116 may communicate the images 160, 162, . . . , 164 to the MVIP 122, which in turn may combine all illuminated portions Qi1, Qh1, . . . , Qg2, thereby generating the composite image 166 of the entire countersink 130. The MVIP 122 (and the LSCM 116) may then use and coordinate image tuning and processing algorithms, as well as perform specific and quantifiable evaluations of the countersink 130 within the composite image 166 to calculate, display and record evidence of accurate countersink 130 generation (e.g., display the measured countersink width W4 as within range), or to highlight inconsistencies that render the component 113 out of tolerance.

For example, the one or more corrective parameters may be routinely used, within the manufacturing environment 200, to maintain consistency of each precision countersink by adjusting numerically controlled mechanisms (e.g., any of the tooling implemented with the deploying mechanism 114) for dynamic part conditions, and to record quantifiable evidence of the countersink compliance to engineering tolerance in the precision countersinks generated on production parts, such as component 113. In instances when countersink width W4 is used as the primary measure of compliance to prescribed tolerances, dynamic correction of the countersink width W4 may be performed. For example, if W4 is smaller than the desired countersink 130 width, then the deploying mechanism 114 may be deployed and the countersink 130 may be enlarged until its width W4 is within the prescribed dimensional tolerance. If W4 is greater that the desired countersink 130 width, then the countersink 130 may be marked as non-compliant and correction to the countersink cutter depth may be performed so that the next countersink may be cut so W4 is within the prescribed dimensional tolerance.

Additionally, there may be instances when the hole 131 is drilled perpendicular to the surface 154 (and a circle is visible in image 174 in FIG. 1G), however, the countersink 130 may be drilled at an angle. In such instances, the composite image 166 will be characterized with varying width W4 (e.g., the width W4 will be at a maximum at one point, and at a minimum in the opposite point). Such deviation can still be detected by the MVIP 122 (FIG. 2) by analyzing the widths W4 around the entire countersink 130. If a variation in the width W4 is detected, then the countersink 130 may be deemed sub-par due to, for example, drilling at an angle or a defect in the drill bit.

Figure 4A:
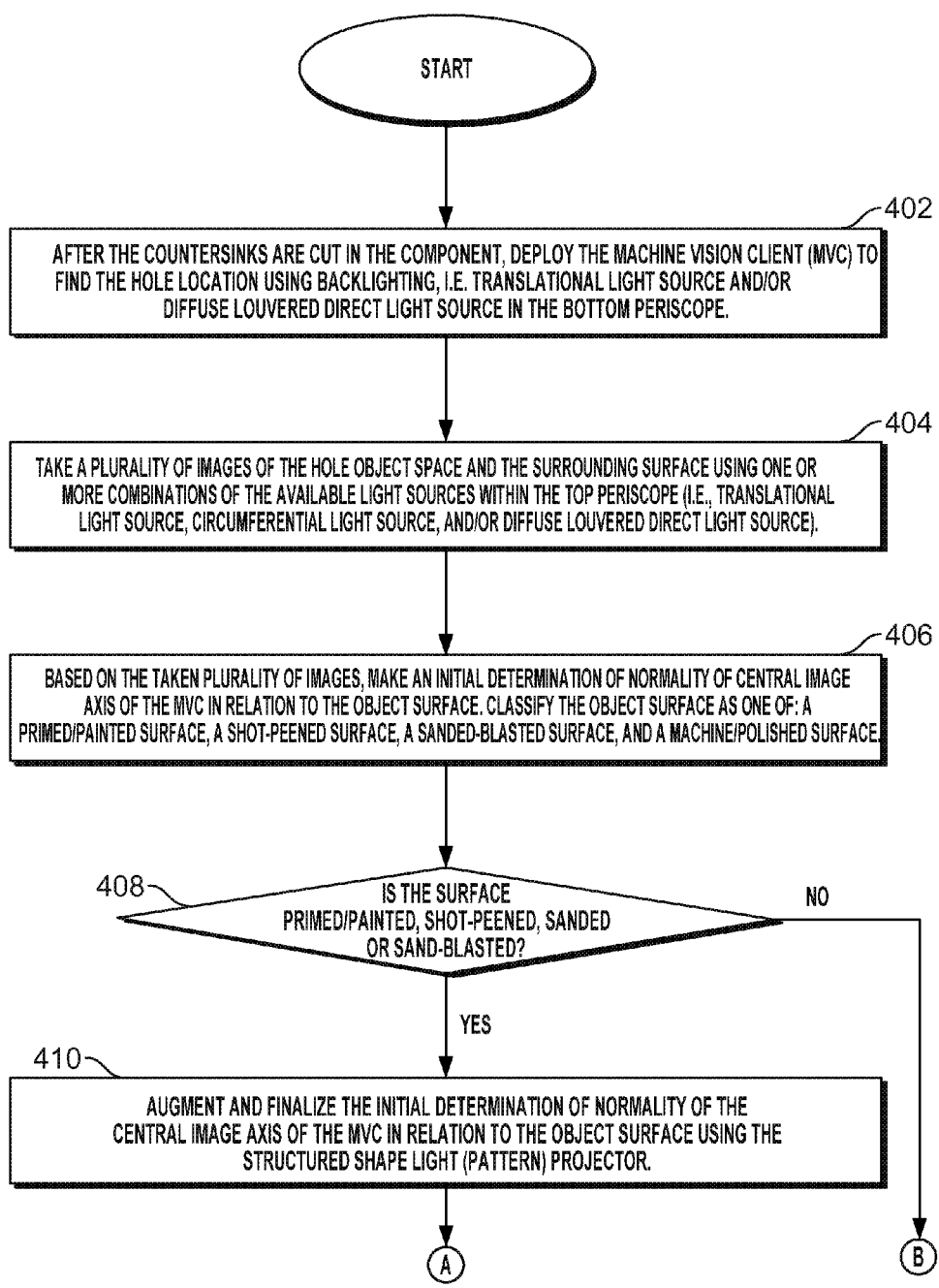
FIGS. 4A-4B are illustrations of operations performed for quantifying compliance of precision countersinks to design and engineering dimensions and tolerance, based on inspecting the precision countersinks using a DPMVC, in accordance with an exemplary embodiment.
Figure 4B:
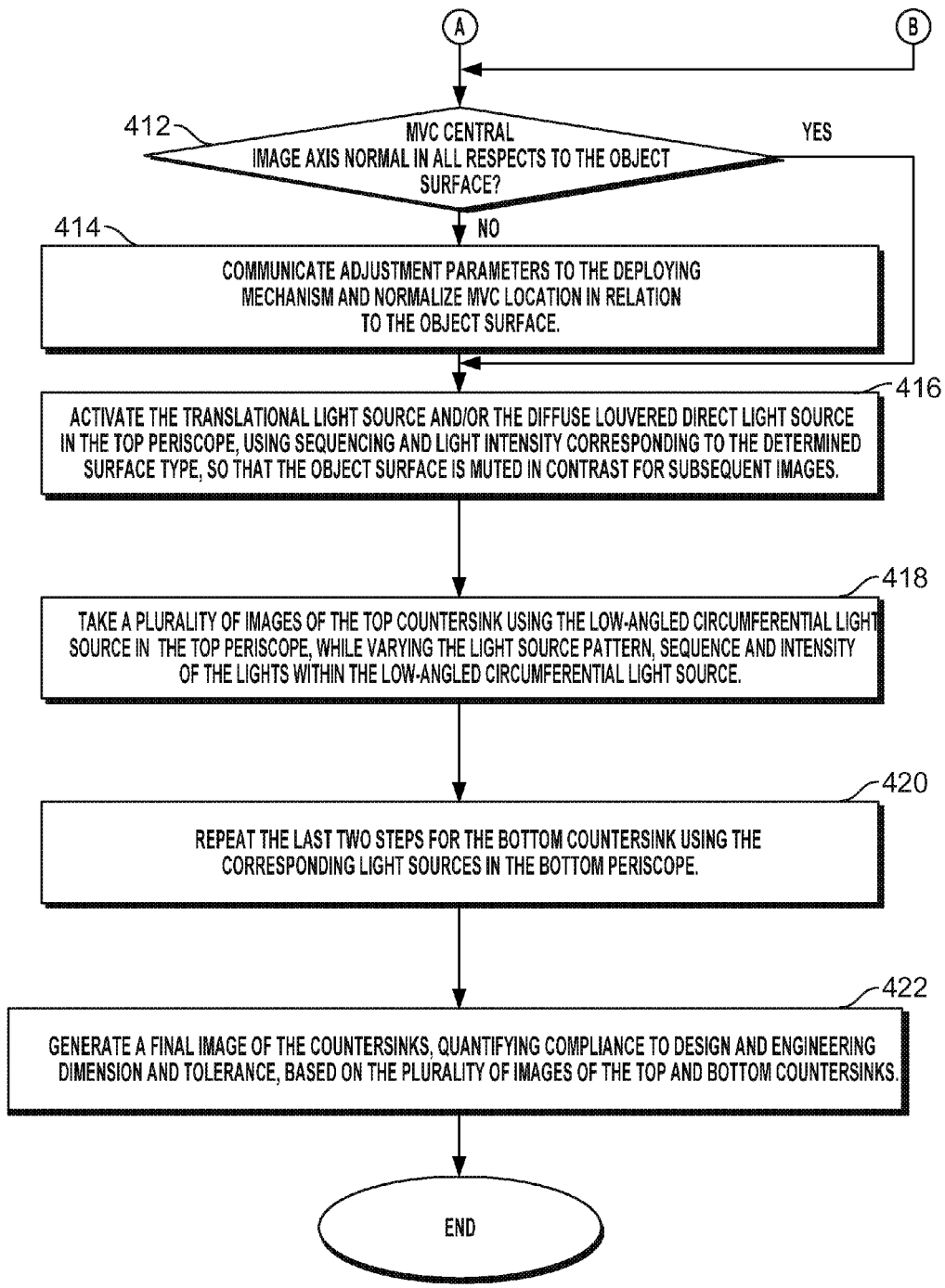

FIGS. 4A-4B are illustrations of operations performed for quantifying compliance of precision countersinks to design and engineering dimensions and tolerance, based on inspecting the precision countersinks using a DPMVC, in accordance with an exemplary embodiment. Referring to FIGS. 1A-2 and 4A-4B, the exemplary operations may begin at step 402, where after the countersinks 130, 133 are cut in the component 113, the DPMVC 100 may be deployed by the deploying mechanism 114 to find the hole 130 location using backlighting (e.g., illumination 170 generated by the diffuse louvered direct light source 109b, as explained above in reference to FIG. 1G).

At 404, the DPMVC 100 may take a plurality of images 160, 162, . . . , 164 of the object space 110 and the countersink 130 using one or more combinations of the available light sources within the top periscope 105a (i.e., the translational light sources 106 or 120, the low-angle circumferential light source 108, and/or the diffuse louvered direct light source 109a). For example, the LSCM 116 may sets various sequences and combinations of all available structured light sources (106/120, 108, 109) to characterize the object surface 154 (as primed/painted surface, shot-peened surface, sanded, sand-blasted surface, or machined/polished surface).

At 406, the MVIP 122 may perform an initial determination of normality of the central image axis of the DPMVC 100 (e.g., axis 119, indicated as A1) in relation to the object surface 154 within the object space 110, based on the taken plurality of images. Additionally, the MVIP 122 may classify the object surface 154 as one of: primed/painted surface, shot-peened surface, sanded, sand-blasted surface, and machined/polished surface.

At 408, it may be determined whether the object surface 154 is one of a primed/painted, a shot-peened, a sanded or a sand-blasted surface. If it is determined that the object surface 154 is one of a primed/painted, a shot-peened, a sanded or a sand-blasted surface, then at 410, the MVIP 122 may augment and finalize the initial determination of normality of the central image axis (e.g., A1) of the DPMVC 100 in relation to the object surface 154 using the structured shape light projector 111. If it is determined that the object surface 154 is a machined/polished surface, then processing may continue at step 412, when it may be determined whether the DPMVC central image axis (e.g., A1) is normal in all respects to the object surface 154 within the object space 110.

If it is determined that the DPMVC central image axis (e.g., A1) is not normal in all respects to the object surface 154 within the object space 110, then at 414, the MVIP 122 may communicate adjustment parameters to the deploying mechanism 114, so that the deploying mechanism 114 may normalize the DPMVC 100 location in relation to the object surface 154 within the object space 110. For example, the MVIP 122 may apply artifact transformations to convert image space results into object space unit measures, which may then be returned as positional correction commands to the deploying mechanism 114 and adjusting its position.

If it is determined that the DPMVC central image axis (e.g., A1) is normal in all respects to the object surface 154 within the object space 110, then processing may continue with step 416, where the LSCM 116 may activate the axial translational light source 106 (or the orbital translational light source 120) and/or the diffuse louvered direct light source 109a in the top periscope 105a, using sequencing and light intensity corresponding to the determined surface type, so that the object surface 154 is muted in contrast for subsequent images (as described above in reference to FIGS. 1D and 1H). For example, the LSCM 116 may sequence the low-angle circumferential light source 108 to expose object features, which are not revealed under the direct or diffuse light sources (106, 109). The DPMVC 100 may then return frame-for-sequence captures to the MVIP 122. The MVIP 122 may combine analyses of all surface characterization frames to cancel or greatly subdue surface noise (from the component's surface) from the analysis of the target feature (e.g., the hole 131 and countersink 130).

At 418, the DPMVC 100 may take a plurality of images (e.g., images 160, 162, . . . , 164) of the top countersink 130 using the low-angle circumferential light source 108 in the top periscope 105a, while varying the light source pattern, sequence and intensity of the LEDs within the low-angle circumferential light source 108 via the LSCM 116. Combining the analyses of the frames from the low-angle circumferential light source 108 (e.g., images 160, 162, . . . , 164) together with the muted results from the surface characterization (e.g., image 182 with muted surface 154), a composite image 166 of the target feature (e.g., countersink 130) may be generated, and the target feature (e.g., countersink 130, or counter-bore, keyway, spline, rivet, etc.) can now be accurately quantified (e.g., by determining its width W4).

At 420, the last two steps (416 and 418) may be repeated for the bottom countersink 133 using the corresponding light sources in the bottom periscope 105b. For example, the LSCM 116 may activate the translational light source and/or the diffuse louvered direct light source 109b in the bottom periscope 105b, using sequencing and light intensity corresponding to the determined surface type, so that the object surface 154 is muted in contrast for subsequent images. The DPMVC 100 may then take a plurality of images of the bottom countersink (similar to images 160, 162, . . . , 164) using the low-angle circumferential light source in the bottom periscope 105b, while varying the light source pattern, sequence and intensity of the lights within the low-angle circumferential light source via the LSCM 116.

At 422, the MVIP 122 may generate a final image of the top and bottom countersinks (e.g., composite image 166), quantifying compliance to design and engineering dimension and tolerance, based on the plurality of images (e.g., 160, 162, . . . , 164) of the top and bottom countersinks. For example, the MVIP 122 may apply artifact transformations to convert image space results into object space unit measures, which are returned as positional correction (to the deploying mechanism 114), and quantified inspection results, which are 'branded' by text and indicative graphics, superimposed into the final image of the object and/or optionally appended to an archive table for post processing by other methods and systems.

Based on any of the quantified inspection results, the deploying mechanism 114 may adjust any of the relevant machine processes (e.g., cutting top and bottom countersinks, inserting/upsetting a rivet, applying sealant/fastener to an opening, etc.) per MVIP 122 quantifications. If necessary, the deploying mechanism 114 may position to the refined feature location, and may execute the relevant machine processes again. If the machine processes are re-executed, the MVIP 122 may signal the DPMVC 100 to perform another feature inspection.

Figure 5A:
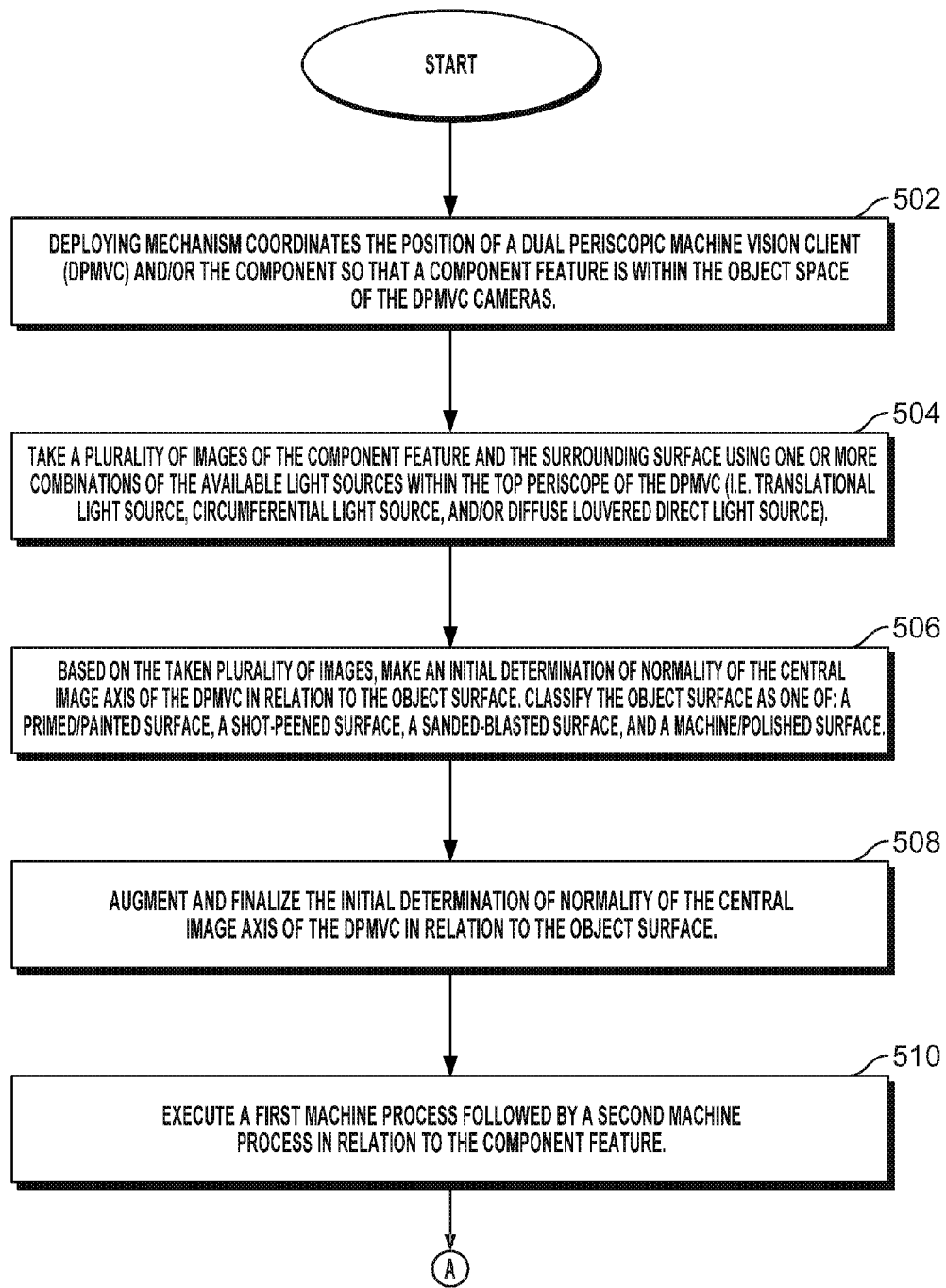
FIGS. 5A-5B are illustrations of operations performed for quantifying compliance of machine processes to design and engineering dimensions and tolerance, based on inspecting the result of the machine processes using a DPMVC, in accordance with an exemplary embodiment.
Figure 5B:
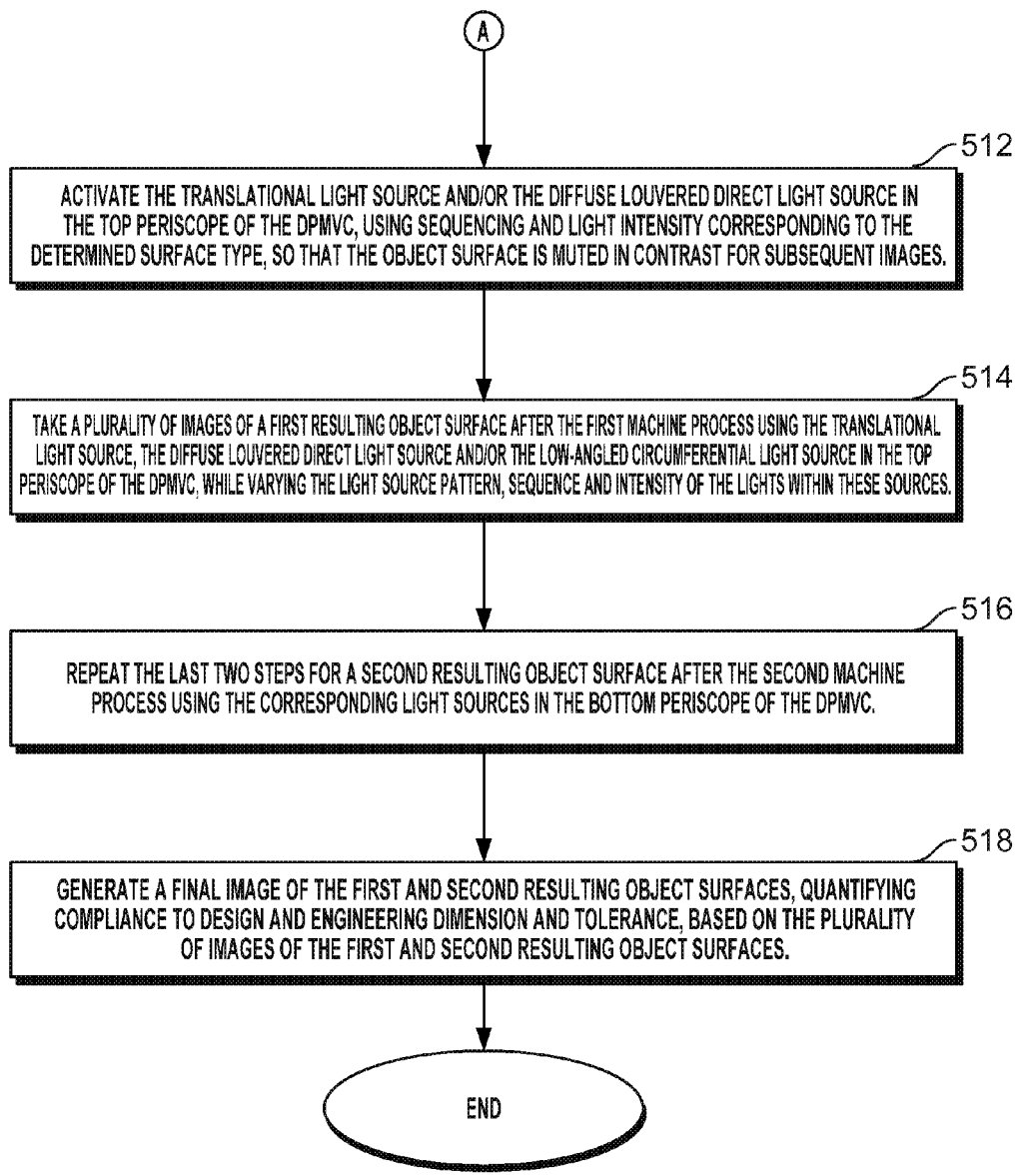

FIGS. 5A-5B are illustration of operations performed for quantifying compliance of machine processes to design and engineering dimensions and tolerance, based on inspecting the result of the machine processes using a DPMVC, in accordance with an exemplary embodiment. Referring to FIGS. 1A-2 and 5A-5B, at 502, the deploying mechanism 114 may coordinate the position of a dual periscopic machine vision client (DPMVC) and/or the component so that a component feature (e.g., a rough opening for a countersink, a rough opening for a rivet, a fastener, etc.) is within the object space 110 of the DPMVC cameras 102a-102b.

At 504, the DPMVC 100 may take a plurality of images of the component feature and the surrounding component surface 154 using one or more combinations of the available light sources within the top periscope 105a of the DPMVC 100 (i.e., the translational light source 106 or 120, the low-angle circumferential light source 108, and/or the diffuse louvered direct light source 109a). For example, the LSCM 116 may sets various sequences and combinations of all available light sources (106/120, 108, 109a-109b) to characterize the object surface 154 (primed/painted surface, shot-peened surface, sanded, sand-blasted surface, or machined/polished surface).

At 506, the MVIP 122 may perform an initial determination of normality of the central image axis of the DPMVC 100 (e.g., axis A1) in relation to the object surface 154 within the object space 110, based on the taken plurality of images. Additionally, the MVIP 122 may classify the object surface as one of: primed/painted surface, shot-peened surface, sanded, sand-blasted surface, and machined/polished surface.

At 508, the MVIP 122 may augment and finalize the initial determination of normality of the central image axis (e.g., A1) of the DPMVC 100 in relation to the object surface (e.g., by using the structured shape light projector 111 if the surface is not machined/polished).

At 510, the MVIP 122 may cause the deploying mechanism 114 to execute a first machine process followed by a second machine process in relation to the component feature. For example, if the component feature is a rough hole opening for precision countersinks, then the first and second machine processes may be cutting the top and bottom precision countersinks (130, 133), respectively. If the component feature is a rough opening for a rivet, the first machine process may be inserting the rivet, and the second machine process may be installing the rivet. If the component feature is an uncapped fastener, then the first machine process may be applying a sealant to the fastener stem, and the second machine process may be applying the fastener cap to the sealant application. If the component feature is a rough hole for a fastener, then the first machine process may be inserting the fastener, and the second machine process may be applying a sealant and a collar, or a cap, or a nut, to the inserted fastener.

At 512, the LSCM 116 may activate the axial translational light source 106 (or the orbital translational light source 120) and/or the diffuse louvered direct light source 109a in the top periscope 105a, using sequencing and light intensity corresponding to the determined surface type, so that the object surface 154 is muted in contrast for subsequent images. For example, the LSCM 116 may sequence the low-angle circumferential light source 108 to expose object features, which are not revealed under the direct or diffuse light sources (106, 109a). The DPMVC 100 may then return frame-for-sequence captures to the MVIP 122. The MVIP 122 may combine analyses of all surface characterization frames to cancel or greatly subdue surface noise (from the component's surface) from the analysis of the target feature. Combining the analyses of the frames from the low-angle circumferential light source 108 together with the muted results from the surface characterization, the target feature (e.g., a cut precision countersink, an upset rivet, a capped fastener, counter-bore, countersink, keyway, spline, etc.) can now be accurately quantified.

At 514, the DPMVC 100 may take a plurality of images of a first resulting object surface after the first machine process using the axial translational light source 106 (or orbital translational light source 120), the diffuse louvered direct light source 109a, and/or the low-angle circumferential light source 108 in the top periscope 105a of the DPMVC 100, while varying the light source pattern, sequence and intensity of the lights within these light sources via the LSCM 116.

At 516, the last two steps (512 and 514) may be repeated for the second resulting object surface after the second machine process using the corresponding light sources in the bottom periscope 105b of the DPMVC 100.

At 518, the MVIP 122 may generate a final image of the first and second resulting object surfaces, quantifying compliance to design and engineering dimension and tolerance, based on the plurality of images of the first and second resulting object surfaces. For example, the MVIP 122 may apply artifact transformations to convert image space results into object space unit measures, which are returned as positional correction (to the deploying mechanism 114), and quantified inspection results, which are 'branded' by text and indicative graphics, superimposed into the final image of the object and/or optionally appended to an archive table for post processing by other methods and systems. In an exemplary embodiment, the MVIP 122 may generate the final image based mainly on the plurality of images of the component feature and the surrounding component surface that were taken using one or more combinations of the available light sources within the top periscope 105a of the DPMVC 100.

Based on any of the quantified inspection results, the deploying mechanism 114 may adjust any of the relevant machine processes (e.g., cutting top and bottom countersinks, inserting/upsetting a rivet, applying sealant/fastener to an opening, etc.) per MVIP 122 quantifications. If necessary, the deploying mechanism 114 may position to the refined feature location, and may execute the relevant machine processes again. If the machine processes are re-executed, the MVIP 122 may signal the DPMVC 100 to perform another feature inspection.

In an exemplary embodiment, the DPMVC 100 may utilize only a single periscope (e.g., the top periscope 105*a*) for quantifiable image analysis of component surfaces. In addition to reduction in device size, such implementation may be useful in instances when the component surface does not have a through hole and inspection of only one surface of the component may be required.

In another exemplary embodiment, referring to FIGS. 1A-2, a method for determining compliance of an aircraft component to design and engineering dimensionality and tolerances within a manufacturing environment 200 may include collecting by the MVIP 122 at least a first image from a first camera 102*a* of an aperture or a first precision countersink of the aircraft component (e.g., component 113), where the first camera 102*a* is in a first position and operates in one or more luminance environments (e.g., using any of the structured light sources 106/120, 108, 109*a*, and 111 within the top periscope 105*a*). The MVIP 122 may collect at least a second image from a second camera 102*b* of the aperture or a second precision countersink of the aircraft component, where the second camera 102*b* is in a second position and operates in an alternative lighting environment (e.g., using any of the structured light source within the bottom periscope 105*b*) to differentiate characteristic features including hole and countersink against their intersection with the component 113. The MVIP 122 may calculate positional and process refinement parameters for one or more numerically controlled mechanisms (e.g., deploying mechanism 114) of the manufacturing environment 200, based on the collected first and second images. The MVIP 122 may communicate positional and process refinement parameters to the deploying mechanism 114, to provide adaptive control of the one or more numerically controlled mechanisms (e.g., 114) of the manufacturing environment 200.

The adaptive control of the at least one or more of the numerically controlled mechanisms (e.g., deploying mechanism 114) may include compensating for one or more of dimensional drift, cutter wear, surface abnormality and/or part distortions within the manufacturing environment. The alternative lighting environment (e.g., any of the light sources within the bottom periscope 105*b*) may be configured to improve contrast of one or more irregular marks on one or more walls of the component 113. The LSCM 116 (or MVIP 122) may activate at least one spectral light source during a first of the one or more luminance environments. The at least one spectral light source may enable characterizing and revealing presence or absence of spectral behavior, concavity, and convexity in the object space in the field of view of the first camera 102*a*. The at least one spectral light source may be disposed axially (e.g., source 106) or orbitally (e.g., orbital translational light source 120) in relation to a central axis A2 of the top periscope 105*a*.

The LSCM 116 may also activate at least one circumferential light source (e.g., the low-angle circumferential light source 108) during a second of the one or more luminance environments. The at least one circumferential light source may include a plurality of louvered spectral light sources (e.g., LEDs), and the plurality of louvered spectral light sources may be disposed at an acute angle in relation to the object space in the field of view of the first camera 102*a*. The MVIP 122 and/or LSCM 116 may activate at least one diffuse louvered direct light source (e.g., 109*a*) during a third of the one or more luminance environments. The at least one diffuse louvered direct light source 109*a* may be operable to flood the object space in the field of view of the first camera with direct, diffuse light to overcome ambient light sources and mute contrast in machine textured surfaces.

In yet another exemplary embodiment, a method for inspecting a component (113) in a manufacturing environment 200 may include deploying (e.g., by the deploying mechanism 114) a first camera 102*a* in a first position relative to an aperture within the component 113. The deploying mechanism 114 may deploy a second camera in a second position relative to the aperture. The MVIP 122 may collecting at least a first image from the first camera 102*a* of the aperture or a first precision countersink of the component 113, where the first camera 102*a* may operate in one or more luminance environments (e.g., by using any of the structured light sources 106/120, 108, 109*a*, 111 within the top periscope 105*a*). The MVIP 122 may collect at least a second image from the second camera 102*b* of the aperture or a second precision countersink of the component, where the second camera 102*b* may operate in an alternative lighting environment (e.g., by using any of the structured light sources within the bottom periscope 105*b*).

The MVIP 122 may generate at least one combined image of the first precision countersink and the second precision countersink based on the collected at least a first image and at least a second image. The at least one combined image may be superimposed with at least one indicator quantifying compliance of the component to one or more technical specifications. The first camera 102*a* (within top periscope 105*a*) and the second camera 102*b* (within bottom periscope 105*b*) may be deployed simultaneously to a top and a bottom surface of the component 113, respectively. The MVIP 122 may locate, during the deploying of the first and second cameras, a hole associated with the first and second precision countersinks, using backlighting provided within the alternative lighting environment of the bottom periscope 105*b*. The backlighting may use at least one translational light source and/or at least one diffuse louvered direct light source (e.g., 109*b*) associated with the second camera 102*b*.

The MVIP 122 may collect a plurality of images of the aperture and or the component surface surrounding the aperture using one or more combinations of a translational light source (e.g., the axial translational light source 106 or the orbital translational light source 120), a circumferential light source (e.g., the low-angle circumferential light source 108) and/or a diffuse louvered direct light source (109*a*) associated with the first camera 102*a* within the top periscope 105*a*. The MVIP 122 may perform an initial determination of normality of a central image axis (e.g., A1) of the field of view of the first camera 102*a* in relation to the component surface surrounding the aperture, based on the collected plurality of images (e.g., the collected at least a first and second images). The MVIP 122 may classify, based on the collected plurality of images, the component surface surrounding the aperture as one of: a primed/painted surface, a shot-peened surface, a sanded surface, a sand-blasted surface, and a machined/polished surface.

If the component surface surrounding the aperture is one of: a primed/painted surface, a shot-peened surface, a sanded surface, and a sand-blasted surface, the MVIP 122 may finalize the initial determination of normality using a structured shape light projector (e.g., 111) associated with the first camera 102*a*. The MVIP 122 may activate at least one spectral light source during a first of the one or more luminance environments. The at least one spectral light source may enable characterizing and revealing presence or absence of spectral behavior, concavity, and convexity in the object space in the field of view of the first camera 102*a*. The at least one spectral light source may be disposed axially (e.g., the axial translational light source 106) or orbitally (e.g., the orbital translational light source 120) in relation to a central axis of the first camera 102a (e.g., central axis A2). The LSCM 116 may activate at least one circumferential light source (e.g., the low-angle circumferential light source 108) during a second of the one or more luminance environments. The at least one circumferential light source may include a plurality of louvered spectral light sources (e.g., LEDs), which louvered spectral light sources may be disposed at an acute angle in relation to the object space 110 in the field of view of the first camera 102a. The LSCM 116 may activate at least one diffuse louvered direct light source (e.g., 109a) during a third of the one or more luminance environments. The at least one diffuse louvered direct light source 109a may be operable to flood the object space 110 in the field of view of the first camera 102a with direct, diffuse light to overcome ambient light sources and mute contrast in machine textured surfaces.

Figure 6A:
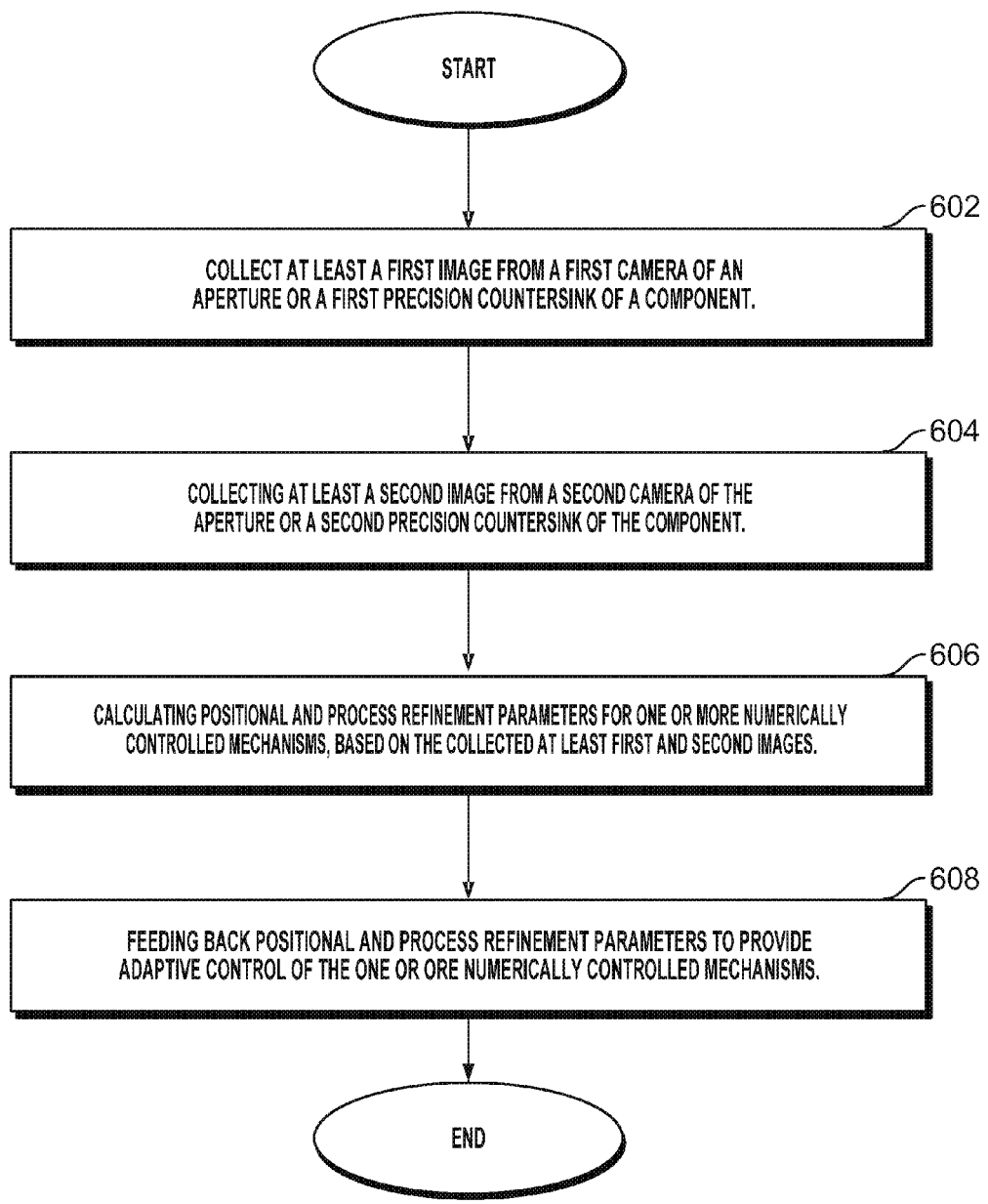
FIG. 6A is illustration of operations performed for measuring dimensionality of a component, in accordance with an exemplary embodiment.

FIG. 6A is illustration of operations performed for measuring dimensionality of a component, in accordance with an exemplary embodiment. Referring to FIGS. 1A-2 and 6A, measuring of the dimensionality may begin at 602 by collecting at least a first image from a first camera (e.g., camera 102a) of an aperture or a first precision countersink of the component (e.g., component 113). At 604, at least a second image may be collected from a second camera (e.g., camera 102b) of the aperture or a second precision countersink of the component (e.g., component 113). At 606, positional and process refinement parameters may be calculated for one or more numerically controlled mechanisms, based on the collected at least first and second images. For example, the MVIP 122 may calculate such positional and process refinement parameters for the deploying mechanism 114. At 608, the calculated positional and process refinement parameters may be fed back to one or more image processors (e.g., the MVIP 122) to provide adaptive control of the one or more numerically controlled mechanisms (e.g., the deploying mechanism 114).

The first camera (e.g., camera 102a) may be in a first position and may operate in one or more luminance environments using one or more of a plurality of structured light sources (as explained herein above). The second camera (e.g., camera 102b) may be in a second position and may operate in an alternative lighting environment (e.g., by using one or more structured light sources within the bottom periscope 105b) to differentiate characteristic features of the component, such as hole and countersink against their intersection with the surface of the component. The adaptive control of the one or more of the numerically controlled mechanisms may include compensating for one or more of dimensional drift, cutter wear, surface abnormality and part distortions. The alternative lighting environment may be configured to improve contrast of one or more irregular marks on one or more walls of the component. At least one spectral light source may be activated during a first of the one or more luminance environments. The at least one spectral light source may enable characterizing and revealing presence or absence of one or more of spectral behavior, concavity, and convexity in an object space in a field of view of the first camera 102a.

The at least one spectral light source may be disposed axially or orbitally in relation to a central axis (e.g., central axis A2) of the first camera (e.g., camera 102a). At least one circumferential light source may be activated during a second of the one or more luminance environments. The at least one circumferential light source may include a plurality of louvered spectral light sources, the plurality of louvered spectral light sources disposed at an acute angle in relation to the object space 110 in the field of view of the first camera. At least one diffuse louvered direct light source may also be activated during a third of the one or more luminance environments. The at least one diffuse louvered direct light source may be operable to flood the object space in the field of view of the first camera with direct, diffuse light to overcome ambient light sources and mute contrast in machine textured surfaces.

Figure 6B:
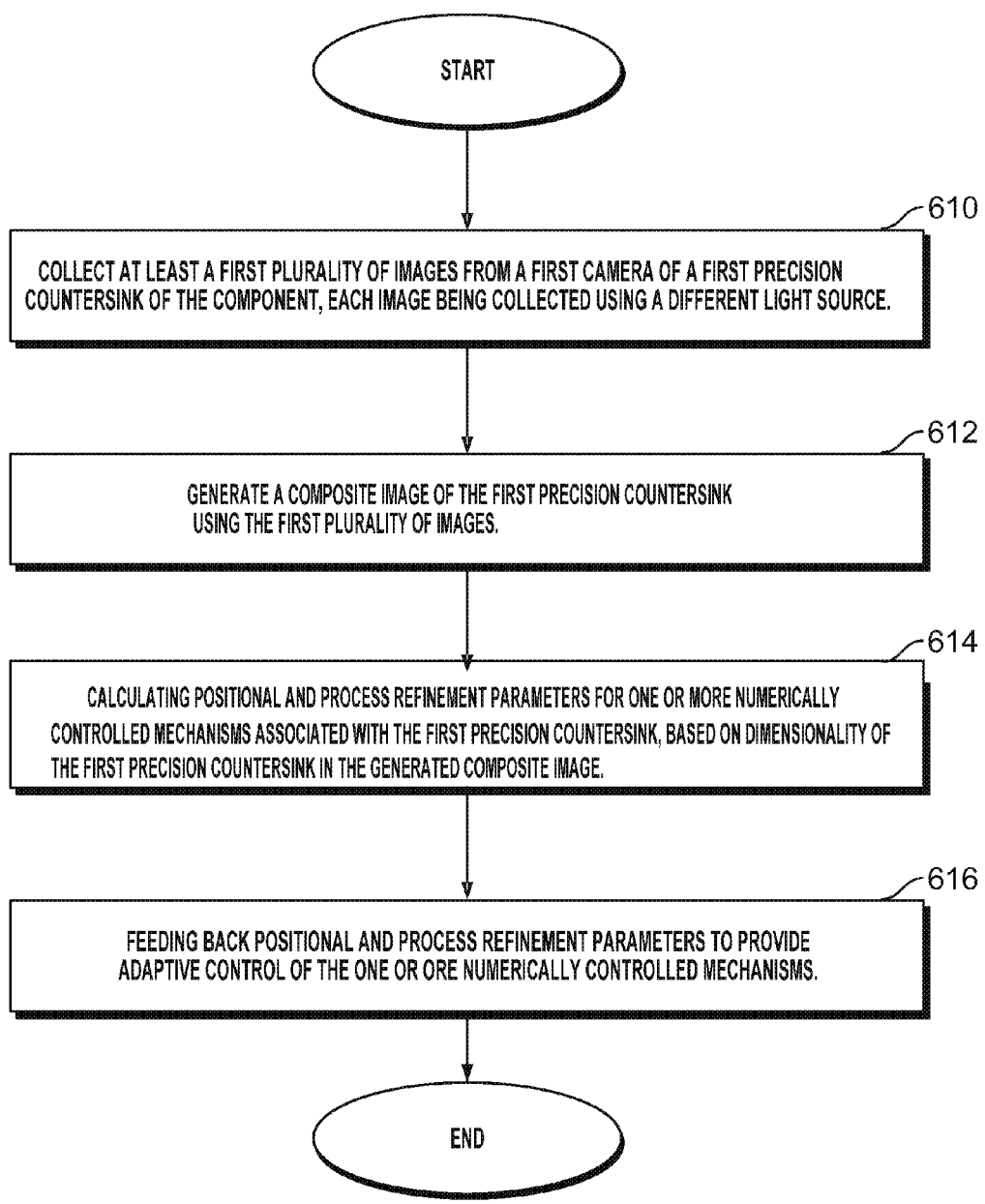
FIG. 6B is another illustration of operations performed for measuring dimensionality of a component, in accordance with an exemplary embodiment.

FIG. 6B is another illustration of operations performed for measuring dimensionality of a component, in accordance with an exemplary embodiment. Referring to FIGS. 1A-2 and 6B, measuring of the dimensionality may begin at 610 by collecting at least a first plurality of images (e.g., images 160, 162, ..., 164) from a first camera (e.g., camera 102a) of a first precision countersink (e.g., countersink 130) of the component (e.g., component 113). Each of the plurality of images may be collected using a different light source (e.g., the LEDs i1, ..., g2 in the low-angle circumferential light source 108). At 612, a composite image (e.g., image 166) of the first precision countersink (e.g., countersink 130) may be generated using the first plurality of images (e.g., images 160, 162, ..., 164). At 614, positional and process refinement parameters may be calculated for one or more numerically controlled mechanisms (e.g., deploying mechanism 114) associated with the first precision countersink, based on dimensionality of the first precision countersink (e.g., countersink width W4) in the generated composite image (e.g., image 166). For example, the MVIP 122 may calculate such positional and process refinement parameters for the deploying mechanism 114. At 616, the positional and process refinement parameters may be fed back to one or more image processors (e.g., the MVIP 122) to provide adaptive control of the one or more numerically controlled mechanisms (e.g., the deploying mechanism 114).

Figure 7:
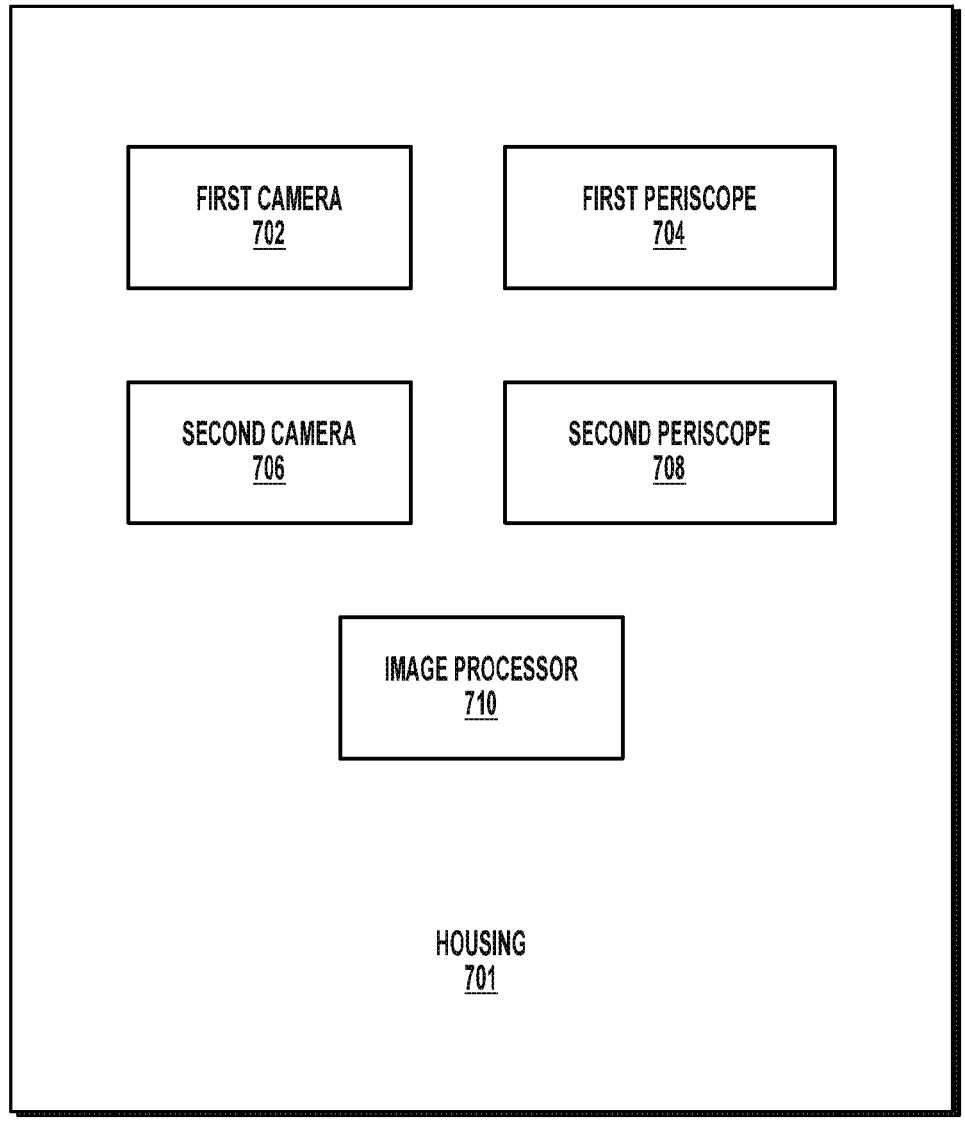
FIG. 7 is a block diagrammatic view of an exemplary DPMVC, in accordance with an exemplary embodiment.

FIG. 7 is a block diagrammatic view of an exemplary DPMVC, in accordance with an exemplary embodiment. Referring to FIG. 7, there is illustrated an apparatus (e.g., the DPMVC 100) for inspecting a component. The DPMVC may comprise a housing 701. The housing 701 may comprise a first camera 702, a second camera 706, a first periscope 704, a second periscope 708 and an image processor 710. The housing 701, the first camera 702, and the second camera 706 may have substantially similar functionalities as the housing 101 and the first and second cameras 102a-102b, which are disclosed herein above. Additionally, the first periscope 704, the second periscope 708 and the image processor 710 may have substantially similar functionalities as periscopes 105a-105b and the MVIP 122, respectively.

The first periscope 704 may be disposed within the field of view of the first camera 702. The second periscope 708 may be disposed within the field of view of the second camera 706. During a component inspection, the image processor 710 may be configured to collect at least a first image from the first camera 702 of an aperture or a first precision countersink of the component. The first camera 702 may operate in at least one lighting environment (by, e.g., using at least one structured light source, such as 106/120, 108, 109a, and/or 111 in reference to FIGS. 1A-2). The image processor 710 may also be configured to collect at least a second image from the second camera 706 of the aperture or a second precision countersink of the component. The second camera 706 may operate in an alternative lighting environment (by, e.g., using any of the structured light sources available within the bottom periscope 708).

The image processor 710 may be further configured to generate at least one combined image of the first precision countersink and the second precision countersink based on the collected at least a first image and at least a second image, where the at least one combined image may be superimposed with at least one indicator quantifying compliance of the component to one or more technical specifications. The image processor 710 may be further configured to calculate positional and process refinement parameters for one or more numerically controlled mechanisms (e.g., the deploying mechanism 114), based on the generated at least one combined image. The at least one processor may also communicate positional and process refinement parameters (to, e.g., the deploying mechanism 114) to provide adaptive control of the one or more numerically controlled mechanisms.

Figure 8A:
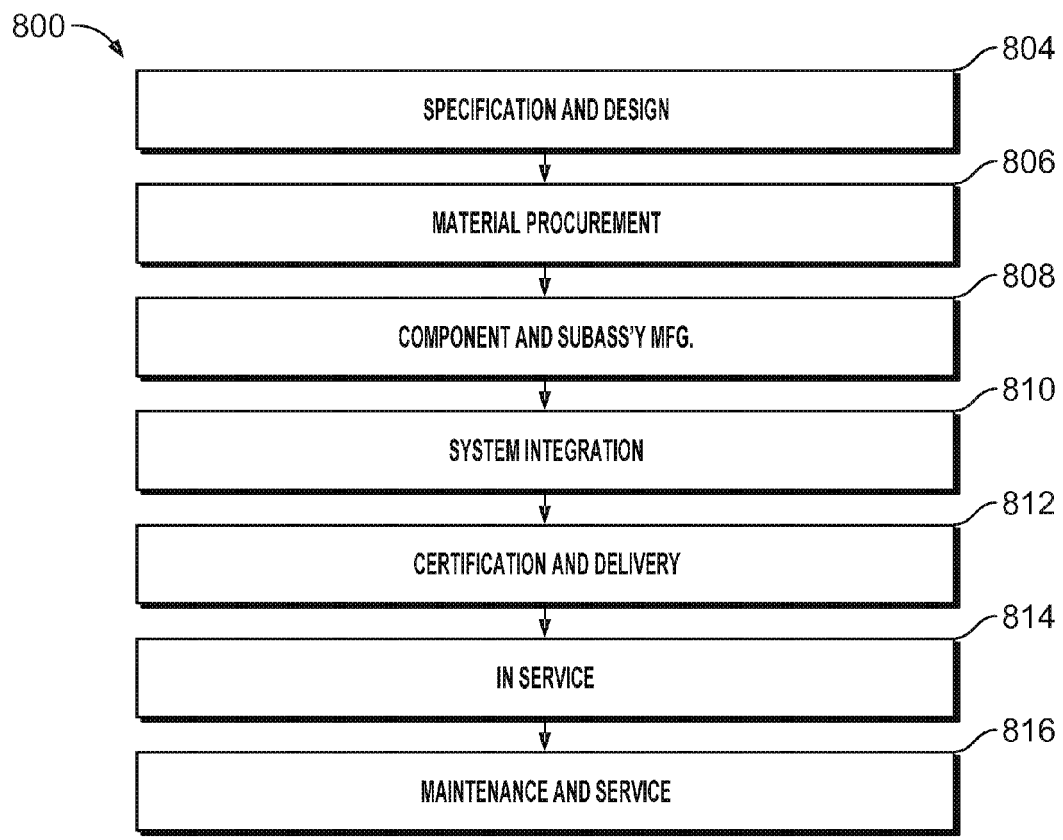
FIG. 8A is a flow diagram of aircraft production and service methodology.
Figure 8B:
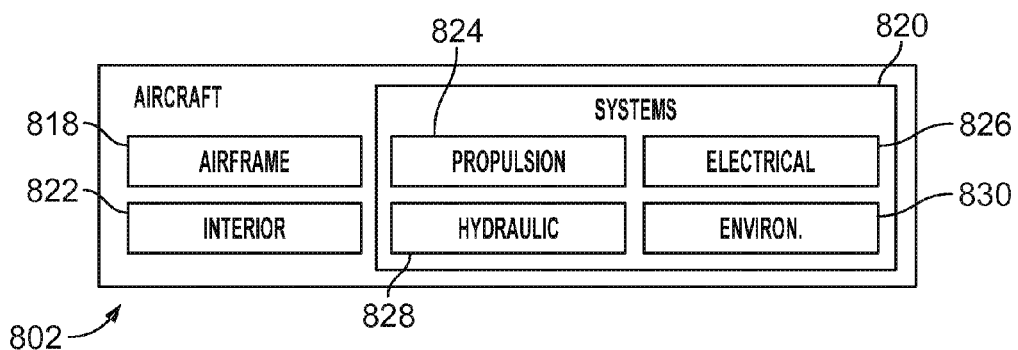
FIG. 8B is a block diagram of an aircraft.

FIG. 8A is a flow diagram of aircraft production and service methodology. FIG. 8B is a block diagram of an aircraft. Referring more particularly to the drawings, embodiments of the present disclosure may be described in the context of an aircraft manufacturing and service method 800 as shown in FIG. 8A and an aircraft 802 as shown in FIG. 8B. During pre-production, the exemplary method 800 may include specification and design 804 of the aircraft 802 and material procurement 806. During production, component and subassembly manufacturing 808 and system integration 810 of the aircraft 802 takes place. Thereafter, the aircraft 802 may go through certification and delivery 812 in order to be placed in service 814. While in service by a customer, the aircraft 802 may be scheduled for routine maintenance and service 816 (which may also include modification, reconfiguration, refurbishment, and so on).

Each of the processes of method 800 may be performed or carried out by a system integrator, a third party, and/or an operator (e.g., a customer). For the purposes of this description, a system integrator may include without limitation any number of aircraft manufacturers and major-system subcontractors; a third party may include without limitation any number of venders, subcontractors, and suppliers; and an operator may be an airline, leasing company, military entity, service organization, and so on.

As shown in FIG. 8B, the aircraft 802 produced by the exemplary method 800 may include an airframe 818 with a plurality of systems 820 and an interior 822. Examples of high-level systems 820 include one or more of a propulsion system 824, an electrical system 826, a hydraulic system 828, and an environmental system 830. Any number of other systems may be included. Although an aerospace example is shown, the principles of the invention may be applied to other industries, such as the automotive industry.

Apparatus and methods embodied herein may be employed during any one or more of the stages of the production and service method 800. For example, components or subassemblies corresponding to production process 808 may be fabricated or manufactured in a manner similar to components or subassemblies produced while the aircraft 802 is in service. Also, one or more of the presently disclosed apparatus embodiments, method embodiments, or a combination thereof, may be utilized during the production stages 808 and 810, for example, by inspecting precision countersinks in metal structures by machine vision. Such inspection of precision countersinks may be used with regard to numerous components of the aircraft 802, substantially expediting assembly of, or reducing the cost of, the aircraft 802. Similarly, one or more of the disclosed apparatus embodiments, method embodiments, or a combination thereof, may be utilized while the aircraft 802 is in service, for example and without limitation, to maintenance and service 816. In this regard, by measuring (in a component that is being inspected or serviced) dimensionality of precision countersinks by machine vision (as disclosed herein above), it may be determined whether the inspected component complies with design and engineering dimensionality and tolerances.

Certain embodiments may comprise a non-transitory machine-readable medium having stored thereon, a computer program having at least one code section for communicating information within a network, the at least one code section being executable by a machine for causing the machine to perform one or more of the method steps described herein. The machine-readable medium may include, for example, CD/DVD-ROM or any other type of storage medium that is readable by a computer device.

Accordingly, aspects of the present disclosure may be realized in hardware, software, firmware or a combination thereof. The present disclosure may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present disclosure may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present disclosure, or portions thereof, may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present disclosure.

While the present disclosure has been described with reference to certain embodiments, it will be understood by those skilled in the art that various changes may be made and equivalents may be substituted without departing from the spirit and scope of the present disclosure. In addition, many modifications may be made to adapt a particular situation or material to the teachings of the present disclosure without departing from its scope. Therefore, it is intended that the present disclosure not be limited to the particular embodiments disclosed, but that the present disclosure will include all embodiments falling within the scope of the appended claims.

What is claimed is:

1. A method for measuring dimensionality of a component, the method comprising:

collecting at least a first plurality of images from a first camera of a first precision countersink of the component, wherein each of said first plurality of images is collected using a different light source of a plurality of light sources, and wherein a first image of said first plurality of images is captured by said first camera when a first light source of said plurality of light sources is activated and a second light source of said plurality of light sources is inactivated, and a second image of said first plurality of images is captured by said first camera when said second light source of said plurality of light sources is activated and said first light source of said plurality of light sources is inactivated, wherein said first camera comprises a first lens and is attached to and housed within a housing, and wherein said first lens is circumferentially shielded by a first end portion of a first elongate hollow tube that extends from said housing, said first elongate hollow tube further comprising a second end portion that comprises a first mirror and a first opening;

generating a composite image of said first precision countersink using said first plurality of images, wherein generating said composite image of said first precision countersink comprises superimposing said first plurality of images;

calculating positional and process refinement parameters for one or more numerically controlled mechanisms associated with said first precision countersink, based on dimensionality of said first precision countersink in said generated composite image; and feeding back said positional and process refinement parameters to provide adaptive control of said one or more numerically controlled mechanisms.

2. The method according to claim 1, comprising:

collecting at least a second image from a second camera of a second precision countersink of the component, said second precision countersink being a bottom countersink of a hole and said first precision countersink being a top countersink of said hole, wherein:

said second camera comprises a second lens and is attached to and housed within said housing, and wherein said second lens is circumferentially shielded by a first end portion of a second elongate hollow tube that extends from said housing in a direction parallel to said first elongate hollow tube, said second elongate hollow tube further comprising a second end portion that comprises a second mirror and a second opening facing said first opening;

said first camera is in a first position and operates in one or more luminance environments; and said second camera is in a second position and operates in an alternative lighting environment to differentiate characteristic features including hole and countersink against their intersection with the surface of the component.

3. The method according to claim 2, wherein said alternative lighting environment is configured to improve contrast of one or more irregular marks on one or more walls of the component.

4. The method according to claim 2, comprising activating at least one spectral light source during a first of said one or more luminance environments, wherein said at least one spectral light source enables characterizing and revealing presence or absence of at least one of spectral behavior, concavity, and convexity in an object space in a field of view of said first camera.

5. The method according to claim 4, wherein said at least one spectral light source is disposed axially or orbitally in relation to a central axis of said first camera.

6. The method according to claim 4, comprising activating at least one circumferential light source during a second of said one or more luminance environments, wherein said at least one circumferential light source comprises a plurality of louvered spectral light sources, said plurality of louvered spectral light sources disposed at an acute angle in relation to said object space in said field of view of said first camera.

7. The method according to claim 6, comprising activating at least one diffuse louvered direct light source during a third of said one or more luminance environments, wherein said at least one diffuse louvered direct light source is operable to flood said object space in said field of view of said first camera with direct, diffuse light to overcome ambient light sources and mute contrast in machine textured surfaces.

8. The method according to claim 1, wherein said adaptive control of said one or more of the numerically controlled mechanisms comprises compensating for one or more of dimensional drift, cutter wear, surface abnormality and part distortions.

9. A method for inspecting a component, the method comprising:

deploying a first camera in a first position above and outside of a first precision countersink within the component, wherein said first camera comprises a first lens and is attached to and housed within a housing, and wherein said first lens is circumferentially shielded by a first end portion of a first elongate hollow tube that extends from said housing, said first elongate hollow tube further comprising a second end portion that comprises a first mirror and a first opening;

deploying a second camera in a second position below and outside of said first precision countersink, wherein said second camera comprises a second lens and is attached to and housed within said housing, and wherein said second lens is circumferentially shielded by a first end portion of a second elongate hollow tube that extends from said housing in a direction parallel to said first elongate hollow tube, said second elongate hollow tube further comprising a second end portion that comprises a second mirror and a second opening facing said first opening;

collecting at least a first plurality of images from said first camera of said first precision countersink of the component, wherein said first camera operates in a plurality of luminance environments provided by a plurality of light sources each positioned outside of said first precision countersink; and generating at least one combined image of said first precision countersink based on said collected at least said first plurality of images, wherein said at least one combined image is superimposed with at least one indicator quantifying compliance of said first precision countersink to one or more technical specifications.

10. The method according to claim 9, comprising:

collecting at least a second plurality of images from said second camera of a second precision countersink of the component, wherein said second camera operates in an alternative lighting environment;

generating at least a second combined image of said second precision countersink based on said collected at least said second plurality of images, wherein said at least said second combined image is superimposed with at least one indicator quantifying compliance of said second precision countersink to said one or more technical specifications, wherein said first camera and said second camera are deployed simultaneously to a top and a bottom surface of the component, respectively.

11. The method according to claim 10, comprising locating, during said deploying of said first and second cameras, a hole associated with said first and second precision countersinks, wherein said locating uses backlighting provided within said alternative lighting environment.

12. The method according to claim 11, wherein said backlighting uses at least one translational light source and/or at least one diffuse louvered direct light source associated with said second camera.

13. The method according to claim 9, comprising collecting a plurality of images of said first precision countersink or a component surface surrounding said first precision countersink using one or more combinations of a translational light source, a circumferential light source and a diffuse louvered direct light source associated with said first camera.

14. The method according to claim 13, comprising:
performing an initial determination of normality of a central axis of a field of view of said first camera in relation to said component surface surrounding said first precision countersink, based on said collected plurality of images; and
classifying, based on said collected plurality of images, said component surface surrounding said first precision countersink as one of: a primed/painted surface, a shot-peened surface, a sanded surface, a sand-blasted surface, and a machined/polished surface.

15. The method according to claim 14, comprising, if said component surface surrounding said first precision countersink is one of: a primed/painted surface, a shot-peened surface, a sanded surface, and a sand-blasted surface, finalizing said initial determination of normality using a structured shape light projector associated with said first camera.

16. The method according to claim 9, comprising activating at least one spectral light source during a first of said plurality of luminance environments, wherein said at least one spectral light source enables characterizing and revealing presence or absence of spectral behavior, concavity, and convexity in an object space in a field of view of said first camera.

17. The method according to claim 16, wherein said at least one spectral light source is disposed axially or orbitally in relation to a central axis of said first camera.

18. The method according to claim 16, comprising activating at least one circumferential light source during a second of said plurality of luminance environments, wherein said at least one circumferential light source comprises a plurality of louvered spectral light sources, said plurality of louvered spectral light sources disposed at an acute angle in relation to said object space in said field of view of said first camera.

19. The method according to claim 18, comprising activating at least one diffuse louvered direct light source during a third of said plurality of luminance environments, wherein said at least one diffuse louvered direct light source is operable to flood the object space in said field of view of said first camera with direct, diffuse light to overcome ambient light sources and mute contrast in machine textured surfaces.

20. A method for measuring dimensionality of a component, the method comprising:
collecting at least a first plurality of images from a first and second camera of a precision countersink of an aircraft component, wherein said first camera comprises a first lens and is attached to and housed within a housing, and wherein said first lens is circumferentially shielded by a first end portion of a first elongate hollow tube that extends from said housing, said first elongate hollow tube further comprising a second end portion that comprises a first mirror and a first opening, and wherein said second camera comprises a second lens and is attached to and housed within said housing, and wherein said second lens is circumferentially shielded by a first end portion of a second elongate hollow tube that extends from said housing in a direction parallel to said first elongate hollow tube, said second elongate hollow tube further comprising a second end portion that comprises a second mirror and a second opening facing said first opening, and wherein said first and second elongate hollow tubes are independently operable to produce a plurality of luminance environments for said precision countersink, each of said plurality of luminance environments being associated with activation of a different type of light source, to differentiate characteristic features including hole and countersink against their intersection with the component;

calculating positional and process refinement parameters for one or more numerically controlled mechanisms, based on a composite image generated using said collected at least said first plurality of images, said composite image being generated by superimposing said collected at least said first plurality of images; and feeding back said positional and process refinement parameters to provide adaptive control of said one or more numerically controlled mechanisms.

21. The method according to claim 20, wherein said adaptive control of said one or more numerically controlled mechanisms comprises compensating for one or more of dimensional drift, cutter wear, surface abnormality and part distortions.

22. The method according to claim 20, wherein said plurality of luminance environments is configured to improve contrast of one or more irregular marks on one or more walls of the component.

23. The method according to claim 20, comprising activating at least one spectral light source during a first of said plurality of luminance environments, wherein said at least one spectral light source enables characterizing and revealing presence or absence of at least one of spectral behavior, concavity, and convexity in an object space in a field of view of said camera.

24. The method according to claim 23, wherein said at least one spectral light source is disposed axially or orbitally in relation to a central axis of said camera.

25. The method according to claim 23, comprising activating at least one circumferential light source during a second of said plurality of luminance environments, wherein said at least one circumferential light source comprises a plurality of louvered spectral light sources, said plurality of louvered spectral light sources disposed at an acute angle in relation to said object space in said field of view of said camera.

26. The method according to claim 25, comprising activating at least one diffuse louvered direct light source during a third of said plurality of luminance environments, wherein said at least one diffuse louvered direct light source is operable to flood said object space in said field of view of said periscopic camera with direct, diffuse light to overcome ambient light sources and mute contrast in machine textured surfaces.

* * * * *